(12) United States Patent  
Matsumura

(10) Patent No.: US 11,493,732 B2
(45) Date of Patent: Nov. 8, 2022

(54) LENS SYSTEM, CAMERA SYSTEM, AND IMAGING SYSTEM

(71) Applicant: Panasonic Intellectual Property Management Co., Ltd., Osaka (JP)

(72) Inventor: Yoshio Matsumura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 414 days.

(21) Appl. No.: 16/709,644

(22) Filed: Dec. 10, 2019

(65) Prior Publication Data

US 2020/0110245 A1 Apr. 9, 2020

Related U.S. Application Data

(63) Continuation of application No. PCT/JP2018/004774, filed on Feb. 13, 2018.

(30) Foreign Application Priority Data

Jun. 13, 2017 (JP) .............................. JP2017-115546

(51) Int. Cl.
*G02B 9/64* (2006.01)
*G02B 5/00* (2006.01)
(Continued)

(52) U.S. Cl.
CPC ............... *G02B 9/64* (2013.01); *G02B 5/005* (2013.01); *G02B 13/18* (2013.01); *G02B 9/60* (2013.01);
(Continued)

(58) Field of Classification Search
CPC .......... G02B 9/64; G02B 5/005; G02B 13/18; G02B 9/62; G02B 13/0045; G02B 9/60;
(Continued)

(56) References Cited

U.S. PATENT DOCUMENTS 11,012,621 B2 * 5/2021 Yatsuri ..................... G02B 3/06
11,327,278 B2 * 5/2022 Matsumura ............ G02B 13/18
(Continued)

FOREIGN PATENT DOCUMENTS

JP 2006-011093 A 1/2006
JP 2010-276755 A 12/2010
(Continued)

OTHER PUBLICATIONS

Communication pursuant to Article 94(3) EPC dated Aug. 31, 2022 for the related European Patent Application No. 18817976.6.

*Primary Examiner* — Evelyn A Lester
(74) *Attorney, Agent, or Firm* — McDermott Will & Emery LLP

(57) ABSTRACT

A lens system forms an image on an imaging element having a quadrilateral shape disposed on an optical axis. The lens system includes a second free-curved lens being asymmetrical with respect to the optical axis. A sag amount of the second free-curved lens in a circle separated from the optical axis by a length having a predetermined ratio with respect to a minimum image height has extrema outside of a first intersection points between a first surface passing through the optical axis and parallel to longer sides of the imaging element and the circle, and a second intersection point between a second surface passing through the optical axis and parallel to shorter sides of the imaging element and the circle. Each of the extrema is greater than the sag amount at the first intersection point or the second intersection point by 0.01 mm or greater.

19 Claims, 14 Drawing Sheets

(51) Int. Cl.
*G02B 13/18* (2006.01)
*G02B 9/60* (2006.01)
*H04N 5/225* (2006.01)
*G03B 5/00* (2021.01)
*G02B 13/08* (2006.01)
*G02B 13/00* (2006.01)
*G02B 9/62* (2006.01)
*G08B 13/196* (2006.01)

(52) U.S. Cl.
CPC ............ *G02B 9/62* (2013.01); *G02B 13/0045* (2013.01); *G02B 13/08* (2013.01); *G03B 5/00* (2013.01); *G08B 13/19628* (2013.01); *H04N 5/2259* (2013.01)

(58) Field of Classification Search
CPC .... G02B 13/08; G03B 5/00; G08B 13/19628; H04N 5/2259
USPC ........ 359/642, 648, 668, 708, 720, 724, 725
See application file for complete search history.

(56) References Cited

U.S. PATENT DOCUMENTS

| | | |
|---|---|---|
| 2004/0169726 A1 | 9/2004 | Moustier et al. |
| 2009/0073577 A1 | 3/2009 | Jung et al. |
| 2010/0302647 A1 | 12/2010 | Hirose |
| 2020/0110249 A1* | 4/2020 | Matsumura ............... G02B 9/64 |
| 2020/0116982 A1* | 4/2020 | Matsumura ............. G02B 13/18 |
| 2021/0011263 A1* | 1/2021 | Matsumura ............. G02B 5/005 |
| 2021/0096335 A1* | 4/2021 | Zhao ......................... G02B 9/64 |
| 2021/0096346 A1* | 4/2021 | Matsumura ............. G02B 13/18 |

FOREIGN PATENT DOCUMENTS

| | | |
|---|---|---|
| JP | 2016-148725 A | 8/2016 |
| WO | 2003/010599 A1 | 2/2003 |

* cited by examiner (a) YZ CROSS-SECTION (b) XZ CROSS-SECTION (a) YZ CROSS-SECTION (b) XZ CROSS-SECTION

LENS SYSTEM, CAMERA SYSTEM, AND IMAGING SYSTEM

CROSS-REFERENCE OF RELATED APPLICATIONS

This application is a U.S. Continuation of International Patent Application No. PCT/JP2018/004774, filed on Feb. 13, 2018, which in turn claims the benefit of Japanese Application No. 2017-115546, filed on Jun. 13, 2017, the entire disclosures of which Applications are incorporated by reference herein.

BACKGROUND

1. Technical Field

The present disclosure relates to a lens system, a camera system, and an imaging system.

2. Description of the Related Art

A quadrilateral image formed by a lens that does not conform to a central projection style may collapse. When a quadrilateral imaging element is used, an optical image and the imaging element do not fully overlap with each other, increasing an unused region on a photosensitive surface.

Patent Literature (PTL) 1 discloses a method for capturing a panoramic image using an image sensor having an oblong shape. PTL 1 discloses that a toric lens is used as a fisheye objective lens to convert a circular image into a quadrilateral image to allow a quadrilateral imaging element to form the image.

Here, PTL 1 is WO 03/010599.

SUMMARY

A lens system capable of effectively utilizing a region of a photosensitive surface of a quadrilateral imaging element, and a camera system and an imaging system including the lens system are provided.

A lens system according to the present disclosure is a lens system configured to form an image on an imaging element having a quadrilateral shape disposed on an optical axis. The lens system includes a second free-curved lens being asymmetrical with respect to the optical axis. A sag amount of the second free-curved lens in a circle separated from the optical axis by a length having a predetermined ratio with respect to a minimum image height has extrema outside of a first intersection point between a first surface passing through the optical axis and parallel to longer sides of the imaging element and the circle, and a second intersection point between a second surface passing through the optical axis and parallel to shorter sides of the imaging element and the circle. Each of the extrema is greater than the sag amount at the first intersection point or the second intersection point by 0.01 mm or greater.

A camera system according to the present disclosure includes the lens system according to the present disclosure, described above, and the imaging element having a quadrilateral shape and disposed at a position at which the lens system forms an image on the optical axis.

An imaging system according to the present disclosure includes the lens system according to the present disclosure, described above, the imaging element having a quadrilateral shape and disposed at a position at which the lens system forms an image on the optical axis, and an image processor configured to process the image generated by the imaging element.

The present invention can achieve a lens system configured to form an approximately quadrilateral image, and a camera system and an imaging system including the lens system.

DETAILED DESCRIPTION

Exemplary embodiments will be described in detail below with reference to the drawings as appropriate. However, detailed description more than necessary may be omitted. For example, detailed description of well-known matters and redundant description of structures that are substantially the same may be omitted. This is to avoid unnecessary redundancy in the description below and to make the description easily understandable to those skilled in the art.

Note that the attached drawings and the following description are provided for those skilled in the art to fully understand the present disclosure, and are not intended to limit the subject matter as described in the appended claims.

(First Exemplary Embodiment)

Figure 1:
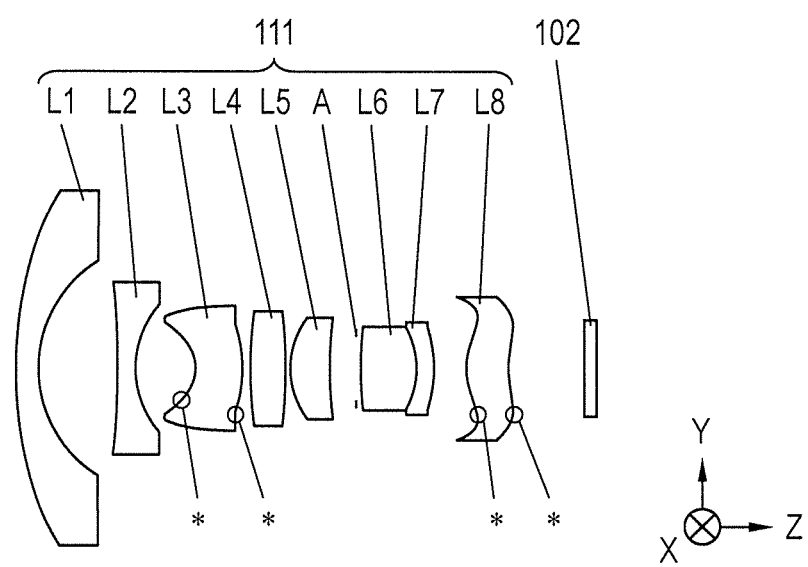
FIG. 1 is a lens layout diagram illustrating an infinity focusing state of a lens system according to a first exemplary embodiment.
Figure 1:
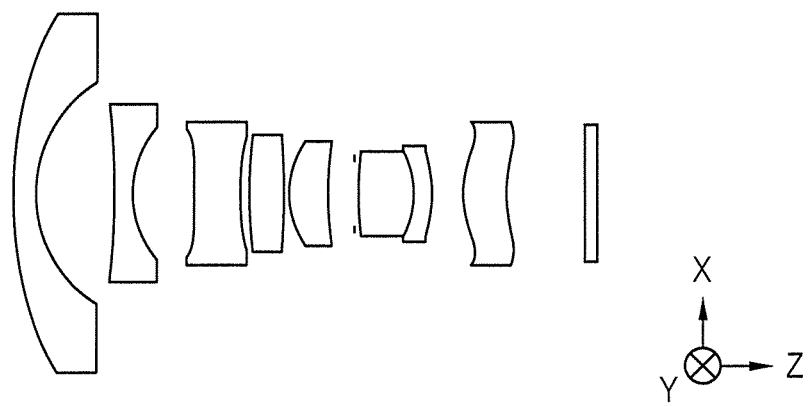

FIG. 1 is a layout diagram of a lens system according to a first exemplary embodiment, illustrating an infinity focusing state.

Part (a) of FIG. 1 is a YZ cross-section, and part (b) of FIG. 1 is an XZ cross-section, each illustrating lens system 111 including eight lens elements, and quadrilateral imaging element 102 having shorter sides and longer sides. An X direction is a direction parallel to the longer sides of imaging element 102. A Y direction is a direction parallel to a shorter side direction of imaging element 102. A Z direction is a direction parallel to an optical axis. The YZ cross-section includes the optical axis, and is a plane parallel to the Y direction and the Z direction. The XZ cross-section includes the optical axis, and is a plane parallel to the X direction and the Z direction.

As illustrated in FIG. 1, lens system 111 according to the first exemplary embodiment includes, in order from an object side to an image surface side, five lens elements L1 to L5, aperture diaphragm A, and three lens elements L6 to L8. A position at which lens system 111 forms an image corresponds to an image surface of imaging element 102. In part (b) of FIG. 1, reference marks are omitted.

Lens system 111 will further be described in detail. Lens system 111 includes, in order from the object side to the image surface side, lens element L1 having a negative meniscus shape where a convex surface faces the object side, lens element L2 having both surfaces formed into concave shapes, lens element L3 having both surfaces formed into concave shapes, lens element L4 having both surfaces formed into convex shapes, lens element L5 having a positive meniscus shape where both surfaces are formed into aspherical shapes and a convex surface faces the object side, aperture diaphragm A, lens element L6 having both surfaces formed into convex shapes, lens element L7 having a negative meniscus shape where a convex surface faces the image surface side, and lens element L8 having a positive meniscus shape where a convex surface faces the object side. Lens element L6 and lens element L7 are joined with each other. In here, lens element L1 is an example of a first lens element, and lens element L2 is an example of a second lens element.

In lens system 111, lens element L3 and lens element L8 each have both surfaces respectively facing the object side and the image surface side and being XY-polynomial, free-curved surfaces. In FIG. 1, the free-curved surfaces are each added with an asterisk "*". In here, lens element L3 is an example of a first free-curved lens, and lens element L8 is an example of a second free-curved lens.

A sag amount of the free-curved surface, facing the image surface side, of lens element L5, in each circle separated from the optical axis by a length that is 40% or greater of a minimum image height, has extrema outside of intersection points with an XZ plane (first surface) passing through the optical axis and parallel to the longer sides of imaging element 102 and a YZ plane (second surface) passing through the optical axis and parallel to the shorter sides of imaging element 102. In here, the sag amount refers to, when a plane orthogonal to an optical axis including intersection points with a surface of a lens element serves as a reference surface, a distance from the reference surface to a point on the surface of the lens element in a direction parallel to the optical axis. Mathematical expressions representing sag amounts, as well as surface data of the lens elements will be described later. Shapes of surfaces of free-curved lenses and aspherical lenses correspond to shapes around the optical axis (peak) in the Y direction.

(Second Exemplary Embodiment)

Figure 2:
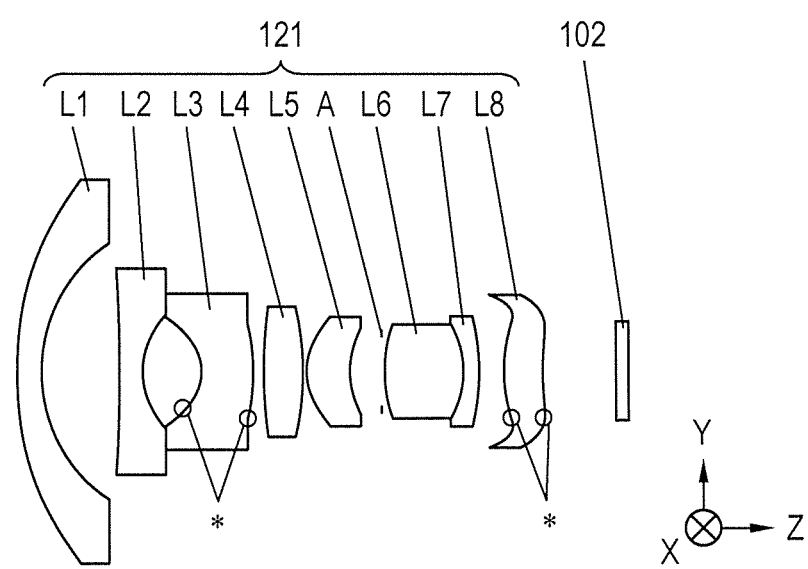
FIG. 2 is a lens layout diagram illustrating an infinity focusing state of a lens system according to a second exemplary embodiment.
Figure 2:
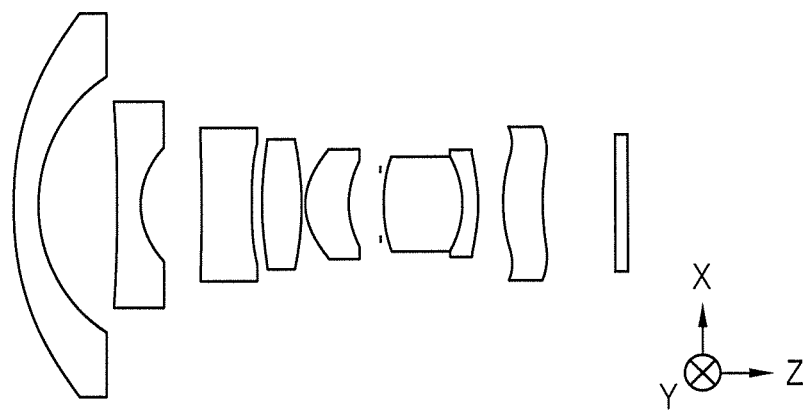

FIG. 2 is a layout diagram of a lens system according to a second exemplary embodiment. Part (a) of FIG. 2 is a YZ cross-section, and part (b) of FIG. 2 is an XZ cross-section, each illustrating lens system 121 including eight lens elements, and quadrilateral imaging element 102 having shorter sides and longer sides. In part (b) of FIG. 2, reference marks are omitted. Compared with lens system 111 according to the first exemplary embodiment, lens system 121 according to the second exemplary embodiment is identical in number, kinds, and a disposition order of lens elements, but differs in surface data of lens system elements L1 to L8. Differences in surface data will be described later. In lens system 121, lens element L1 is an example of a first lens element, lens element L2 is an example of a second lens element, lens element L3 is an example of a first free-curved lens, and lens element L8 is an example of a second free-curved lens.

In lens system 121 according to the second exemplary embodiment, a sag amount of a free-curved surface, facing the image surface side, of lens element L8, in each circle separated from the optical axis by a length that is 20% or greater of a minimum image height, has extrema outside of intersection points with an XZ plane (first surface) passing through the optical axis and parallel to the longer sides of imaging element 102 and a YZ plane (second surface) passing through the optical axis and parallel to the shorter sides of imaging element 102.

(Third Exemplary Embodiment)

Figure 3:
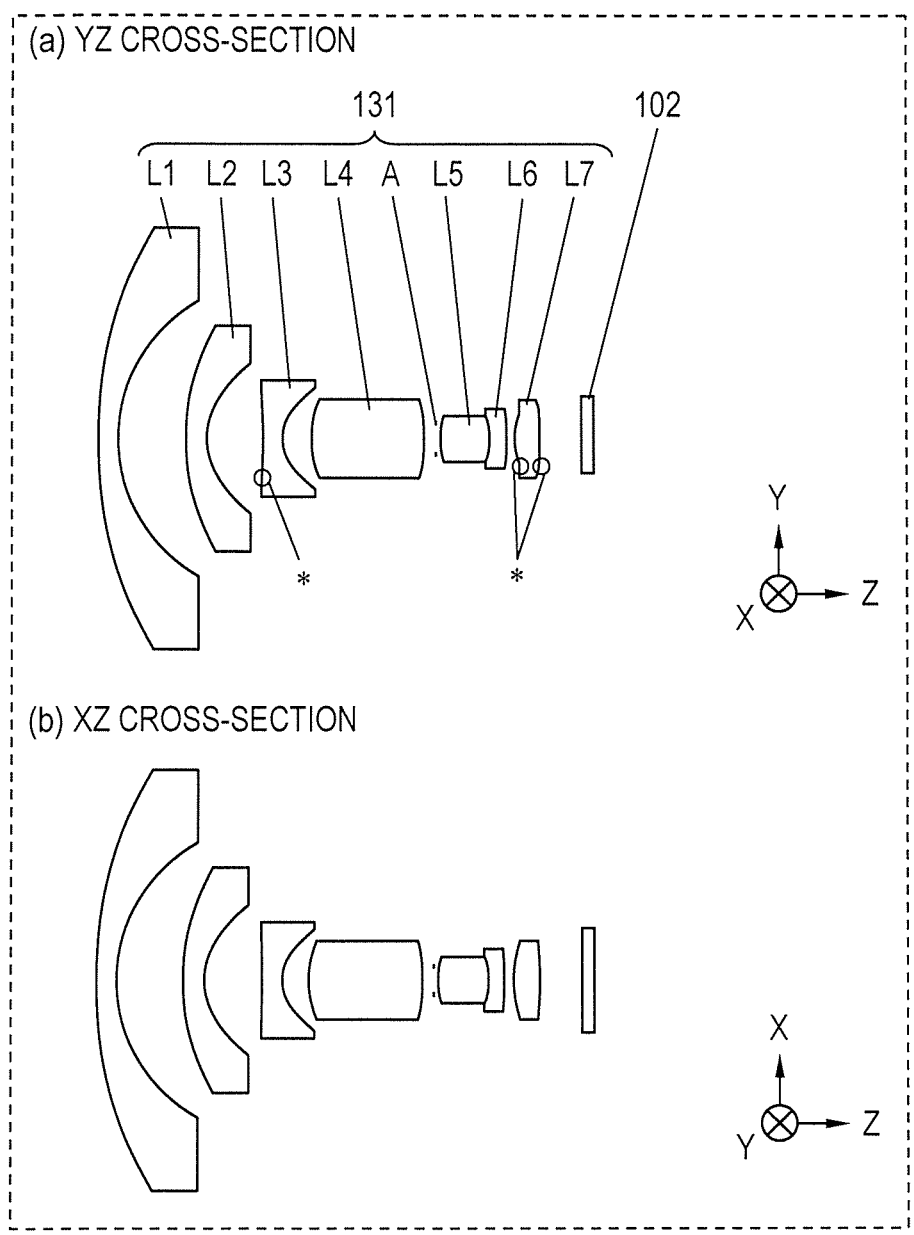
FIG. 3 is a lens layout diagram illustrating an infinity focusing state of a lens system according to a third exemplary embodiment.

FIG. 3 is a layout diagram of a lens system according to a third exemplary embodiment. Part (a) of FIG. 3 is a YZ cross-section, and part (b) of FIG. 3 is an XZ cross-section, each illustrating lens system 131 including seven lens elements, and quadrilateral imaging element 102 having shorter sides and longer sides. In part (b) of FIG. 3, reference marks are omitted. Compared with lens system 111 according to the first exemplary embodiment, lens system 131 according to the third exemplary embodiment differs in number of lens elements (seven) and surface data of lens system elements L1 to L7.

As illustrated in FIG. 3, lens system 131 according to the third exemplary embodiment includes, in order from the object side to the image surface side, four lens elements L1 to L4, aperture diaphragm A, and three lens elements L5 to L7. A position at which lens system 131 forms an image corresponds to the image surface of imaging element 102. Differences in surface data will be described later.

Lens system 131 will further be described in detail. Lens system 131 includes, in order from the object side to the image surface side, lens element L1 having a negative meniscus shape where a convex surface faces the object side, lens element L2 having both surfaces formed into aspherical, concave shapes, lens element L3 having both surfaces formed into concave shapes, lens element L4 having both surfaces formed into convex shapes where one surface facing the object side is formed into an aspherical shape, aperture diaphragm A, lens element L5 having both surfaces formed into convex shapes where one surface facing the object side is formed into an aspherical shape, lens element L6 having a negative meniscus shape where a surface facing the image surface side is formed into an aspherical shape and a convex surface faces the image surface side, and lens element L7 having both surfaces formed into convex shapes. Lens element L5 and lens element L6 are joined with each other. In here, lens element L1 is an example of a first lens element, and lens element L2 is an example of a second lens element.

In lens system 131, lens element L3 has a surface facing the object side and being an XY polynomial, free-curved surface and a surface facing the image surface side and being an aspherical surface. Lens element L7 has both surfaces respectively facing the object side and the image surface side and being XY polynomial, free-curved surfaces. In FIG. 3, the free-curved surfaces are each added with an asterisk "*". In here, lens element L3 is an example of a first free-curved lens, and lens element L7 is an example of a second free-curved lens.

A sag amount of the free-curved surface, facing the object side, of lens element L7, in a circle separated from the optical axis by a length that is 30% or greater of a minimum image height, has extrema outside of intersection points with an XZ plane (first surface) passing through the optical axis and parallel to the longer sides of imaging element 102 and a YZ plane (second surface) passing through the optical axis and parallel to the shorter sides of imaging element 102.

(Configurations Common to First to Third Exemplary Embodiments)

The lens systems according to the first to third exemplary embodiments each include a plurality of lens elements to form an image on quadrilateral imaging element 102 having the shorter sides and the longer sides. The lens systems each include, as lens elements, the free-curved lenses that are rotational asymmetrical with respect to the optical axis. That is, the lens systems each include, in order from the object side to the image surface side, a plurality of the lens elements, an aperture diaphragm, and a plurality of the lens elements. With this configuration, an approximately quadrilateral image that is almost quadrilateral can be formed.

The lens systems according to the first to third exemplary embodiments each have such a configuration that includes at least three or more lens elements that are rotational symmetrical with respect to the optical axis. With this configuration, free-curved lenses have been reduced in number, minimizing unevenness in capability due to directions. Furthermore, the lens systems according to the first to third exemplary embodiments can advantageously shorten calculation periods during designing.

All the free-curved surfaces of the free-curved lenses configuring the lens systems according to the first to third exemplary embodiments, each having a shape that is symmetrical with respect to the XZ plane and the YZ plane, are advantageous in terms of that centers of the free-curved surfaces can be determined, allowing easy management on shapes during manufacturing.

The lens systems according to the first to third exemplary embodiments each have a configuration including, in order from the object side, lens element L1 being a meniscus having a convex shape facing the object side and negative power, and lens element L2 having negative power. This configuration is advantageous in terms of that light entering at a wider angle can be collected, a lens system with a wide field of view can be easily achieved, respective power can be reduced through the two negative lenses arranged in series, and shapes that are easily manufactured can be achieved.

The lens systems according to the first to third exemplary embodiments, each having a configuration where the free-curved lens disposed at a position most adjacent to the image surface side has both surfaces respectively being free-curved surfaces and respectively facing the object side and the image surface side, are advantageous in terms of that position control for image heights and aberration reductions can be easily performed.

The lens systems according to the first to third exemplary embodiments each include the fisheye lens having a half angle of view of 80° or wider. A wider angle of view can thus be covered. Fisheye lenses generally face difficulty in forming an image around diagonal positions of an imaging element. However, by using the free-curved lenses according to the present disclosure, an image can be formed even around the diagonal positions of an imaging element.

For example, it is preferable that a lens system configured to form an image on a quadrilateral imaging element disposed on an optical axis, as can be seen in the lens systems according to the first to third exemplary embodiments, be a lens system including a free-curved lens being asymmetrical with respect to the optical axis. It is also preferable that a sag amount of a free-curved surface of the free-curved lens, in a circle separated from the optical axis by a length that is 40% or greater of a minimum image height, have extrema outside of intersection points with an XZ plane passing through the optical axis and parallel to the longer sides of the imaging element and a YZ plane passing through the optical axis and parallel to the shorter sides of the imaging element (hereinafter, the configuration is referred to as a basic configuration of the exemplary embodiments).

In here, the minimum image height refers to a shortest one among distances on an image surface, from an image point by a ray entering perpendicularly onto imaging element 102 to an end of an image circle formed by a lens system. The lens systems according to the first to third exemplary embodiments each have a minimum image height in the shorter side direction of imaging element 102.

By allowing a sag amount of a surface of a free-curved lens to have extrema outside of intersection points with an XZ plane and a YZ plane, an image can be expanded in particular toward areas around the diagonal positions of imaging element 102. By allowing a range including extrema to be separated from an optical axis by a length that is 40% or greater of a minimum image height in a radial direction, fine image-expanding effects can be achieved. When, different from the basic configuration of the present exemplary embodiments, such a free-curved surface is not included that a sag amount in a circle separated by a length that is 40% or greater of a minimum image height has extrema outside of intersection points with an XZ plane and a YZ plane respectively passing through the optical axis and parallel to the longer sides and the shorter sides of an imaging element, a region of a photosensitive surface of the quadrilateral imaging element cannot be fully utilized. Otherwise, lens elements may increase in number, expanding a lens system in size. As long as a sag amount of a free-curved surface, in a circle separated from an optical axis by a length ranging from 40% to 80% inclusive of a minimum image height, has extrema outside of intersection points with an XZ plane and a YZ plane, the effects described above can further be achieved.

Figure 4:
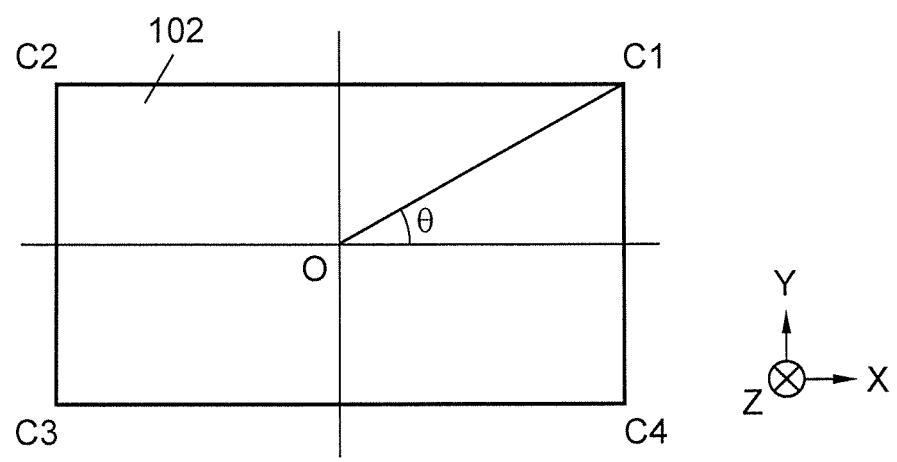
FIG. 4 is a schematic diagram of a photosensitive surface of an imaging element according to the first to third exemplary embodiments.

Positions of extrema of a sag amount for effectively utilizing a region of a photosensitive surface of an imaging element will be described herein. FIG. 4 is a schematic diagram of the photosensitive surface of the imaging element. In FIG. 4, the whole surface, facing the lens system, of imaging element 102 is regarded as the photosensitive surface. When there is otherwise a portion that does not serve as a photosensitive surface around imaging element 102, the portion is regarded as excluded. In FIG. 4, intersection point O between the optical axis of the lens system and the photosensitive surface of imaging element 102 lies at a center of the photosensitive surface of imaging element 102.

When extrema of a sag amount lie in respective directions from intersection point O (the center of the photosensitive surface) to corners C1 to C4 of imaging element 102, the region of the photosensitive surface of imaging element 102 can be most effectively utilized. Within an angle range of θ±25°, an approximately quadrilateral image can be formed. In here, angle θ corresponds, as illustrated in FIG. 4, to an angle formed, with an X axis, by line segment OC1 coupling intersection point O and corner C1. In FIG. 4, angle θ is illustrated in a first quadrant where line segment OC1 lies. As the free-curved surface of the free-curved lens is however symmetrical with respect to both the XZ plane and the YZ plane, the same applies to second to fourth quadrants where line segments OC2, OC3, and OC4 respectively lie.

Figure 5:
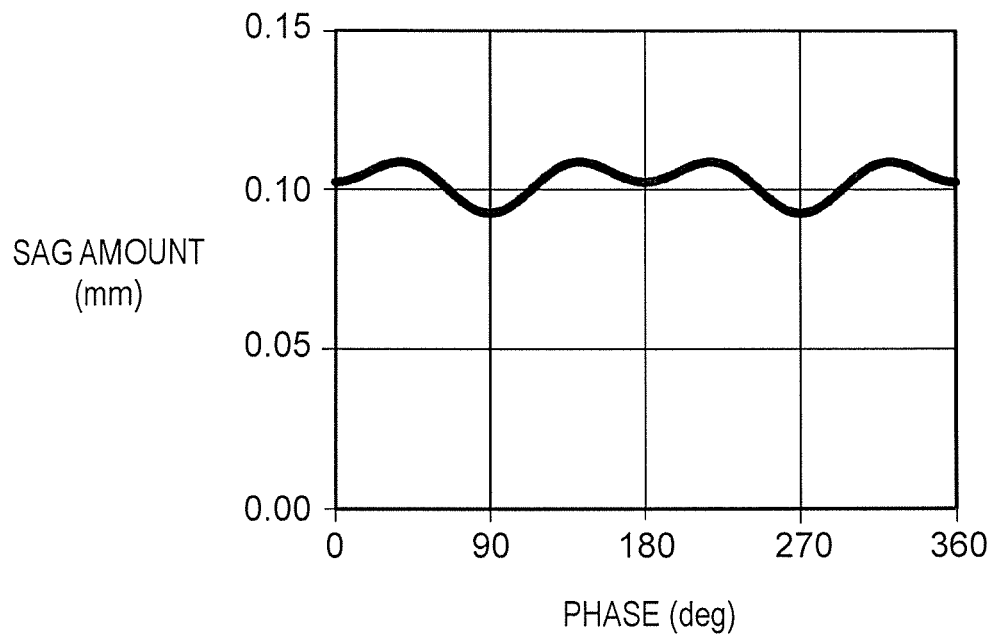
FIG. 5 is a diagram illustrating a relationship between a sag amount of a free-curved lens of the lens system according to the first exemplary embodiment and an angle (phase) about an optical axis.
Figure 6:
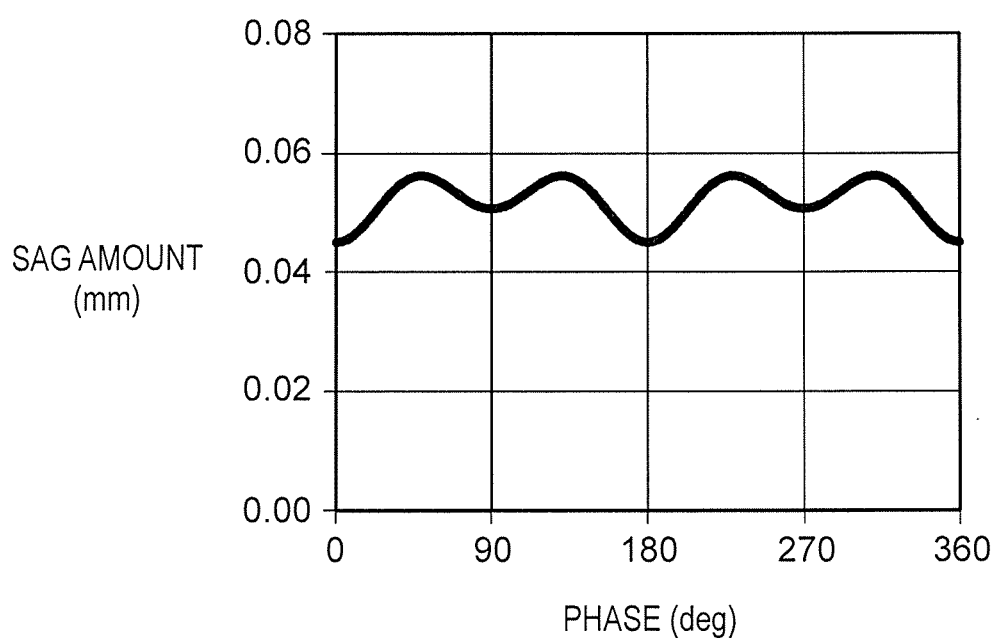
FIG. 6 is a diagram illustrating a relationship between a sag amount of a free-curved lens of the lens system according to the second exemplary embodiment and an angle (phase) about an optical axis.
Figure 7:
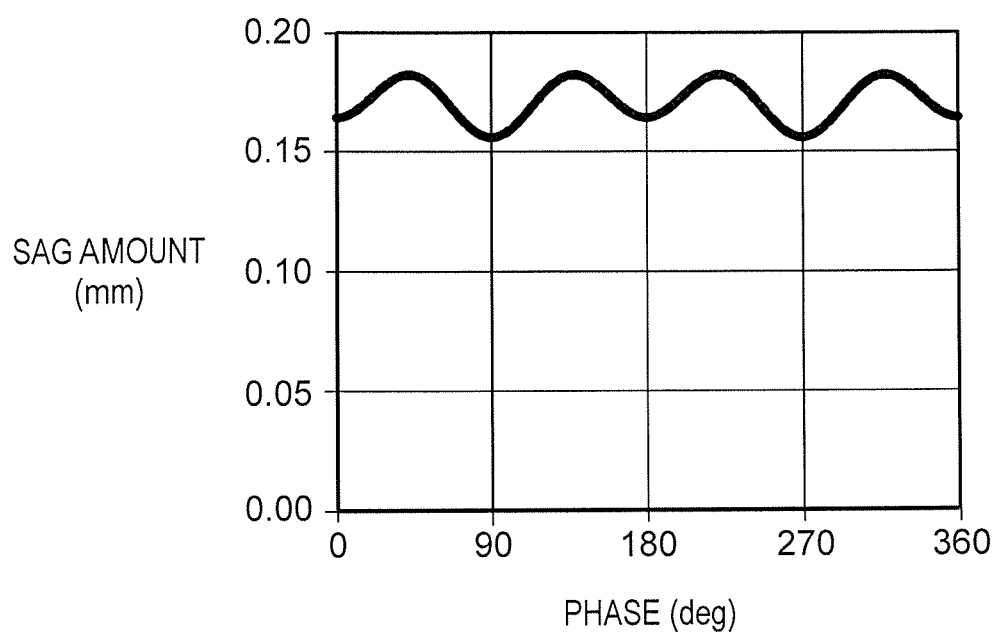
FIG. 7 is a diagram illustrating a relationship between a sag amount of a free-curved lens of the lens system according to the third exemplary embodiment and an angle (phase) about an optical axis.

FIG. 5 illustrates a relationship between a sag amount of the free-curved surface, facing the image surface side, of lens element L8 of lens system 111 according to the first exemplary embodiment and an angle (phase) about the optical axis in a circle separated from the optical axis by a length that is 60% of a minimum image height. FIG. 6 illustrates a relationship between a sag amount of the free-curved surface, facing the image surface side, of lens element L8 of lens system 121 according to the second exemplary embodiment and an angle (phase) about the optical axis in a circle separated from the optical axis by a length that is 60% of a minimum image height. FIG. 7 illustrates a relationship between a sag amount of the free-curved surface, facing the object side, of lens element L7 of lens system 131 according to the third exemplary embodiment and an angle (phase) about the optical axis in a circle separated from the optical axis by a length that is 60% of a minimum image height. FIGS. 5 to 7 illustrate the sag amounts on a whole circumference (i.e., the first to fourth quadrants) of the circle separated from the optical axis by a length that is 60% of a minimum image height.

As illustrated in FIGS. 5 to 7, the sag amounts illustrated in the first quadrant (phases ranging from 0° to)90° and the third quadrant (phases ranging from 180° to)270° are identical to each other, whereas the sag amounts illustrated in the second quadrant (phases ranging from 90° to)180° and the fourth quadrant (phases ranging from 270° to)360° are identical to each other. The sag amounts illustrated in the first quadrant and the second quadrant are symmetrical at a phase of 90°. The sag amounts illustrated in the second quadrant and the third quadrant are symmetrical at a phase of 180°. The sag amounts illustrated in the third quadrant and the fourth quadrant are symmetrical at a phase of 270°. The sag amounts illustrated in the fourth quadrant and the first quadrant are symmetrical at a phase of 360°. In here, the phases of 0° and 180° respectively correspond to positions on the XZ plane (first surface) passing through the optical axis and parallel to the longer sides of imaging element 102. The phases of 90° and 270° respectively correspond to positions on the YZ plane (second surface) passing through the optical axis and parallel to the shorter sides of imaging element 102.

In lens systems 111, 121, and 131 respectively illustrated in FIGS. 5 to 7, the sag amounts respectively have extrema in the first quadrant at phases of approximately 38°, approximately 49°, and approximately 42°. As described above, the lens systems according to the first to third exemplary embodiments have each been designed such that a sag amount has extrema in a range of ±25° in the respective directions from intersection point O between the optical axis and the photosensitive surface of imaging element 102 to corners C1 to C4 of the photosensitive surface. Angle θ in the first quadrant will be described herein. However, the same applies to the second to fourth quadrants.

The lens systems have each been designed based on, for example, an aspect ratio between each of the longer sides and each of the shorter sides of the photosensitive surface of imaging element 102. When a ratio between each of the longer sides and each of the shorter sides of the photosensitive surface of imaging element 102 is a b, the sag amount has extrema each within a range of $\tan^{-1}(b/a)\pm25°$ in a direction (X direction) parallel to the longer sides of imaging element 102. For example, when the ratio between each of the longer sides and each of the shorter sides of imaging element 102 is 9, the sag amount has extrema each within a phase range of 29°±25°. When the ratio between each of the longer sides and each of the shorter sides of imaging element 102 is 4:3, the sag amount has extrema each within a phase range of 37°±25° from the X direction.

A lens system where a sag amount has extrema each within a range of 33°±21° in the X direction, which is common to a range of 29°±25° and a range of 37°±25° in the X direction, can be used for both an imaging element having an aspect ratio of 16:9 and an imaging element having an aspect ratio of 4:3.

A fact that a sag amount has extrema means that the sag amount is inverted on a circle separated from an optical axis by a predetermined distance. It is preferable that at least 3% of a maximum sag amount be inverted on the circle. Such a lens having a free-curved surface, as described above, which has been difficult to manufacture so far, has become possible to manufacture as processing and molding techniques have been advancing in recent years.

It is preferable that a lens system having the basic configuration of the present exemplary embodiments, as can be seen in the lens systems according to the first to third exemplary embodiments, for example, satisfy the following condition (1).

$$\omega_{LONG} > 60° \quad (1)$$

where, $\omega_{LONG}$ is a maximum half angle of view in a longer side direction of the imaging element, and the condition (1) is a condition used for specifying a half angle of view of the lens system. Below a lower limit of the condition (1), the lens system narrows in angle of view. Even without the basic configuration of the present exemplary embodiments, an image circle can become approximately quadrilateral. The region of the photosensitive surface of imaging element 102 having a quadrilateral shape can be easily and effectively utilized. This case may however deviate from the purpose of the present application.

Spherical aberrations become difficult to control as well.

By further satisfying at least either of the following conditions (1)' and (1)", the effects described above can further be achieved.

$$\omega_{LONG} > 80° \quad (1)'$$

$$\omega_{LONG} > 90° \quad (1)''$$

It is preferable that a lens system having the basic configuration of the present exemplary embodiments, as can be seen in the lens systems according to the first to third exemplary embodiments, for example, satisfy the following condition (2).

$$1 < D_{LSHORT}/D_{SSHORT} \quad (2)$$

where, $D_{LSHORT}$ is a maximum distance in the longer side direction between an image point with respect to incident light in the longer side direction of the imaging element and an image point with respect to incident light perpendicular to the imaging element, within an angle of view equivalent to a maximum half angle of view in the shorter side direction of the imaging element, $D_{SSHORT}$ is a maximum distance in the shorter side direction between an image point with respect to incident light and an image point with respect to incident light perpendicular to the imaging element, within the maximum half angle of view in the shorter side direction of the imaging element, and the condition (2) is a condition used for specifying that, for an image point with respect to incident light within a maximum half angle of view in the shorter side direction of the imaging element, an image height in the longer side direction of the imaging element becomes longer than an image height in the shorter side direction. Below a lower limit of the condition (2), effectively utilizing the region of the photosensitive surface of imaging element 102 having a quadrilateral shape becomes difficult. Curvatures of image surface become difficult to control as well.

By further satisfying at least either of the following conditions (2)' and (2)", the effects described above can further be achieved.

$$1.2 < D_{LSHORT}/D_{SSHORT} \quad (2)'$$

$$1.6 < D_{LSHORT}/D_{SSHORT} \quad (2)''$$

It is preferable that a lens system having the basic configuration of the present exemplary embodiments, as can be seen in the lens systems according to the first to third exemplary embodiments, for example, satisfy the following condition (3).

$$0.5 < D_{SSHORT} \times \omega_{LONG}/(D_{LLONG} \times \omega_{SHORT}) < 1 \quad (3)$$

where, $\omega_{LONG}$ is a maximum half angle of view in the longer side direction of the imaging element, $\omega_{SHORT}$ is a maximum half angle of view in the shorter side direction of the imaging element, $D_{LLONG}$ is a maximum distance in the longer side direction between an image point with respect to incident light and an image point with respect to incident light perpendicular to the imaging element, within a maximum half angle of view in the longer side direction of the imaging element, $D_{SSHORT}$ is a maximum distance in the shorter side direction between an image point with respect to incident light and an image point with respect to incident light perpendicular to the imaging element, within the maximum half angle of view in the shorter side direction of the imaging element, and the condition (3) is a condition used for specifying a ratio between the maximum half angle of view and an image height in each of the shorter side direction and the longer side direction of an imaging element. Below a lower limit of the condition (3), an angle of view in the shorter side direction becomes too wide, compared with an angle of view in the longer side direction. An image forming capability becomes difficult to control. In particular, curvatures of image surface become difficult to control. An image circle becomes otherwise too long in the longer side direction. Effectively utilizing the region of the photosensitive surface of imaging element 102 having a quadrilateral shape becomes difficult. Above an upper limit of the condition (3), an angle of view in the longer side direction becomes too wide, compared with an angle of view in the shorter side direction. An image forming capability becomes difficult to control. In particular, curvatures of image surface become difficult to control. An image circle becomes otherwise too long in the shorter side direction. Effectively utilizing the region of the photosensitive surface of imaging element 102 having a quadrilateral shape becomes difficult.

By further satisfying at least either of the following conditions (3)' and (3)", the effects described above can further be achieved.

$$0.55 < D_{SSHORT} \times \omega_{LONG}/(D_{LLONG} \times \omega_{SHORT}) < 0.9 \quad (3)'$$

$$0.6 < D_{SSHORT} \times \omega_{LONG}/(D_{LLONG} \times \omega_{SHORT}) < 0.8 \quad (3)''$$

It is preferable that a lens system having the basic configuration of the present exemplary embodiments, as can be seen in the lens systems according to the first to third exemplary embodiments, for example, satisfy the following condition (4).

$$\omega_{LONG} - \omega_{SHORT} > 0 \quad (4)$$

where, $\omega_{LONG}$ is a maximum half angle of view in the longer side direction of the imaging element, $\omega_{SHORT}$ is a maximum half angle of view in the shorter side direction of the imaging element, and the condition (4) is a condition used for specifying, for a maximum half angle of view, a difference between the longer side direction and the shorter side direction of the imaging element. Below a lower limit of the condition (4), an angle of view in the shorter side direction becomes equal to or greater than an angle of view of the longer side direction. An image would be formed in an extremely irregular shape. Resolution per angle of view would change greater between the longer side direction and the shorter side direction. Spherical aberrations become difficult to control as well, due to a greater change between the longer side direction and the shorter side direction.

By further satisfying the following condition (4)', the effects described above can further be achieved.

$$\omega_{LONG} - \omega_{SHORT} > 8 \quad (4)'$$

It is preferable that a lens system having the basic configuration of the present exemplary embodiments, as can be seen in the lens systems according to the first to third exemplary embodiments, for example, satisfy the following condition (5).

$$L \times Fno./D_{LLONG} < 40 \quad (5)$$

where,

L is an optical total length of the lens system,

Fno. is an F value of the lens system, $D_{LLONG}$ is a maximum distance in the longer side direction between an image point with respect to incident light and an image point with respect to incident light perpendicular to the imaging element, within the maximum half angle of view in the longer side direction of the imaging element, and the condition (5) is a condition used for specifying a relationship among an optical total length of the lens system, an F value of the lens system, and an image height in the longer side direction. Above an upper limit of the condition (5), the lens system becomes too greater in size with respect to the F value of the lens system and the image circle, preventing a small-sized lens system from being achieved. Curvatures of image surface become difficult to control as well.

By further satisfying at least either of the following conditions (5)' and (5)", the effects described above can further be achieved.

$$L \times Fno./D_{LLONG} < 30 \quad (5)'$$

$$L \times Fno./D_{LLONG} < 25 \quad (5)''$$

It is preferable that a lens system having the basic configuration of the present exemplary embodiments, as can be seen in the lens systems according to the first to third exemplary embodiments, for example, satisfy the following condition (6).

$$n_{FREE} < 1.7 \quad (6)$$

where, $n_{FREE}$ is a refraction factor with respect to a d-line of the free-curved lens, and the condition (6) is a condition used for specifying a refraction factor with respect to the d-line of the free-curved lens. Above an upper limit of condition (6), a refraction factor of the free-curved lens becomes too high, greatly bending a ray. Astigmatism becomes difficult to control. Effects of the condition can be achieved even when one of free-curved lenses in a lens system satisfies the condition. When a plurality of free-curved lenses satisfy the condition, the effects can further be achieved.

By further satisfying the following condition (6)', the effects described above can further be achieved.

$$n_{FREE} < 1.6 \quad (6)''$$

It is preferable that a lens system having the basic configuration of the present exemplary embodiments, as can be seen in the lens systems according to the first to third exemplary embodiments, for example, include aperture diaphragm A between an object and an imaging element, and satisfy the following condition (7).

$$-3 \leq N_0 - N_i \leq 3 \quad (7)$$

where, $N_o$ is a number of lens elements disposed closer to the object than the aperture diaphragm is, $N_i$ is a number of lens elements disposed closer to the image surface than the aperture diaphragm is, and the condition (7) is a condition used for specifying a difference in number of lens elements in front of and behind aperture diaphragm A. Below a lower limit of the condition (7), the number of lens elements disposed closer to the image surface than aperture diaphragm A is becomes too greater. The lens system would become greater in size in an optical axis direction. In addition, the number of lens elements disposed closer to the object than aperture diaphragm A is becomes smaller. Curvatures of image surface become difficult to control. Above an upper limit of the condition (7), the number of lens elements disposed closer to the object than aperture diaphragm A is becomes too greater. The lens system would become greater in size in a radial direction. In addition, the number of lens elements disposed closer to the image surface than aperture diaphragm A is becomes smaller. Spherical aberrations become difficult to control.

By further satisfying the following condition (7)', the effects described above can further be achieved.

$$-2 \leq N_o - N_i \leq 2 \quad (7)'$$

It is preferable that a lens system having the basic configuration of the present exemplary embodiments, as can be seen in the lens systems according to the first to third exemplary embodiments, for example, include aperture diaphragm A between the object and imaging element 102, at least one first free-curved lens closer to the object than aperture diaphragm A is, and at least one second free-curved lens closer to the image surface than aperture diaphragm A is. Adopting the configuration described above is advantageous in terms of that curvatures of image surface can be reduced in any directions including the longer side direction, the shorter side direction, and a diagonal direction.

It is preferable that, in a lens system having the basic configuration of the present exemplary embodiments, as can be seen in the lens systems according to the first to third exemplary embodiments, for example, imaging element 102 do not include an image circle of the lens system. In particular, in a lens system using a free-curved lens, securing resolution around ends of an image circle is difficult in terms of designing and manufacturing. By allowing imaging element 102 to not include an image circle, a fine image forming capability can be secured on imaging element 102.

The lens elements configuring the lens systems according to the first to third exemplary embodiments are refraction-type lens elements only (i.e., such a type of lens elements that achieve deflection on an interface between media having different refraction factors) that deflect an incident ray through refraction. However, the present disclosure is not limited to use such lens elements. The lens systems may include, for example, one or any of diffraction-type lens elements that deflect an incident ray through diffraction, refraction and diffraction hybrid-type lens elements that deflect an incident ray through a combination of a diffraction effect and a refraction effect, and refractive index distribution-type lens elements that deflect an incident ray through refractive index distribution in a medium. In particular, when a diffraction structure is formed on an interface of media having different refraction factors in a refraction and diffraction hybrid-type lens element, wavelength dependency of diffraction efficiency is preferably improved.

The lenses configuring the lens systems according to the first to third exemplary embodiments have symmetrical surfaces with respect to the longer sides or the shorter sides of imaging element 102. However, even when asymmetrical surfaces are used, enough effects can be achieved, as long as the basic configuration of the present exemplary embodiments and the conditions are satisfied.

(Fourth Exemplary Embodiment)

Figure 8:
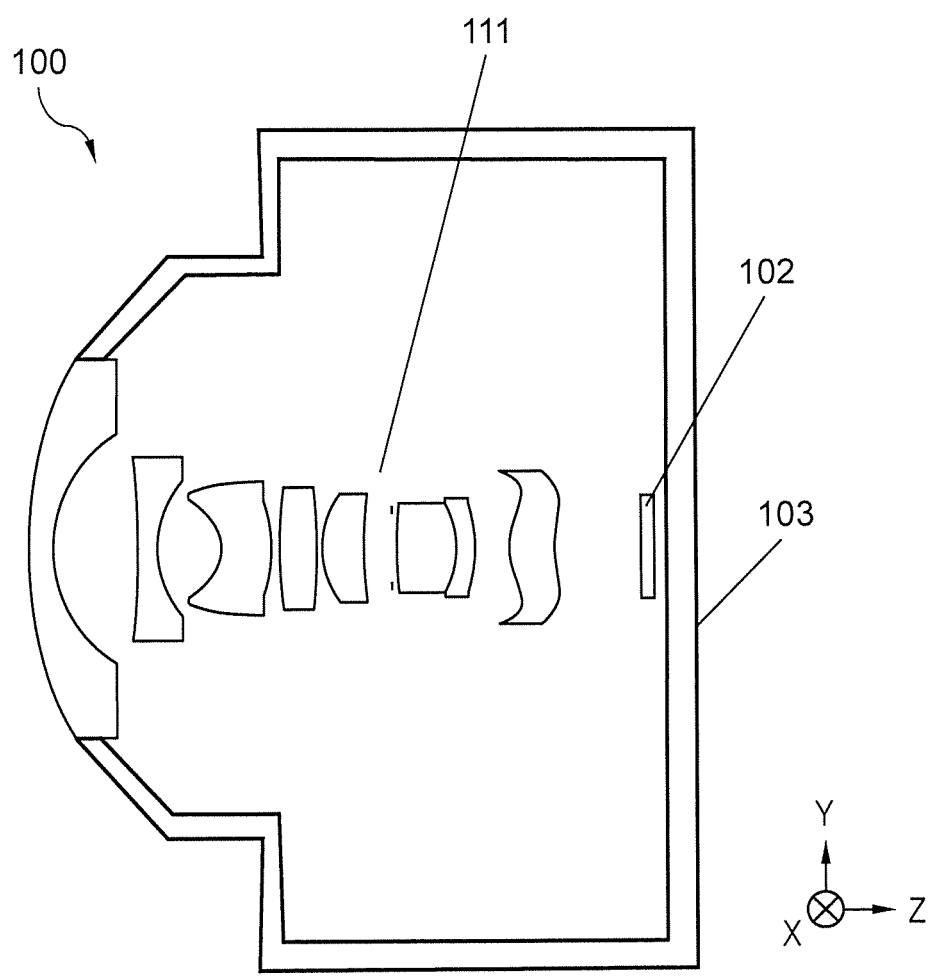
FIG. 8 is a schematic block diagram of a camera system according to a fourth exemplary embodiment.

FIG. 8 is a schematic block diagram of a camera system according to a fourth exemplary embodiment. Camera system 100 according to the fourth exemplary embodiment includes lens system 111, imaging element 102 configured to receive an optical image formed by lens system 111 and to convert the received optical image into an electrical image signal, and camera main body 103. The lens system of the fourth exemplary embodiment can be one of the lens systems according to the first to third exemplary embodiments. FIG. 8 illustrates a case where lens system 111 according to the first exemplary embodiment is used as a lens system.

In the fourth exemplary embodiment, one of the lens systems according to the first to third exemplary embodiments is used. Imaging element 102 can thus form an approximately quadrilateral image. Camera system 100 capable of effectively utilizing the region of the photosensitive surface of imaging element 102 having a quadrilateral shape to obtain an image can be achieved.

(Fifth Exemplary Embodiment)

Figure 9:
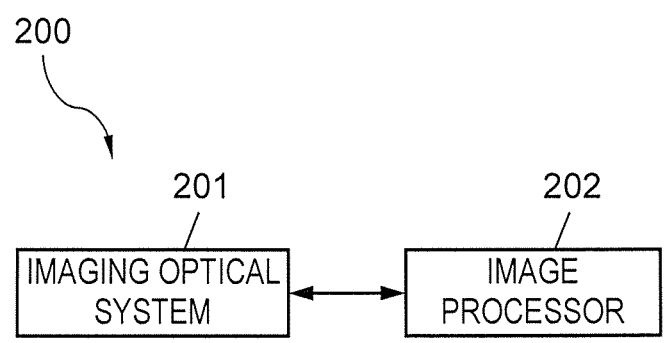
FIG. 9 is a schematic block diagram of an imaging system according to a fifth exemplary embodiment.

FIG. 9 is a schematic block diagram of an imaging system according to a fifth exemplary embodiment. As can be seen in camera system 100 according to the fourth exemplary embodiment, imaging optical system 201 used in imaging system 200 according to the fifth exemplary embodiment includes one of the lens systems according to the first to third exemplary embodiments. By allowing image processor 202 to process an image obtained by imaging optical system 201, the image can be modified and processed into an image applicable in various applications. Image processor 202 may be provided inside or outside of camera main body 103 (see FIG. 8).

(First Numerical Value Example)

A first numerical value example in which lens system 111 according to the first exemplary embodiment has been specifically implemented will be described herein. In the first numerical value example, a unit of length is "mm", and a unit of angle of view is "°" in the drawings and tables. In the first numerical value example, radius of curvature r, surface spacing d, refraction factor nd with respect to the d-line, and Abbe's number vd with respect to the d-line are illustrated. Sag amounts z of surfaces parallel to a Z axis of aspherical and free-curved surfaces are respectively defined by mathematical expression 1 and mathematical expression 2.

$$z = \frac{h^2/r}{1+\sqrt{1-(1+\kappa)(h/r)^2}} + \sum A_n h^n \quad \text{[Mathematical expression 1]}$$

where,
h is Height in radial direction,
k is Conic constant, and
An is n-th aspherical coefficient $$z = \frac{cr^2}{1+\sqrt{1-(1+k)c^2 r^2}} + \sum_{j=2}^{66} c_j x^p y^q \quad \text{[Mathematical expression 2]}$$

$$j = \frac{(p+q)^2 + p + 3q}{2} + 1$$

where,
c is Peak curvature,
k is Conic constant, and
$c_j$ is Coefficient

Figure 10:
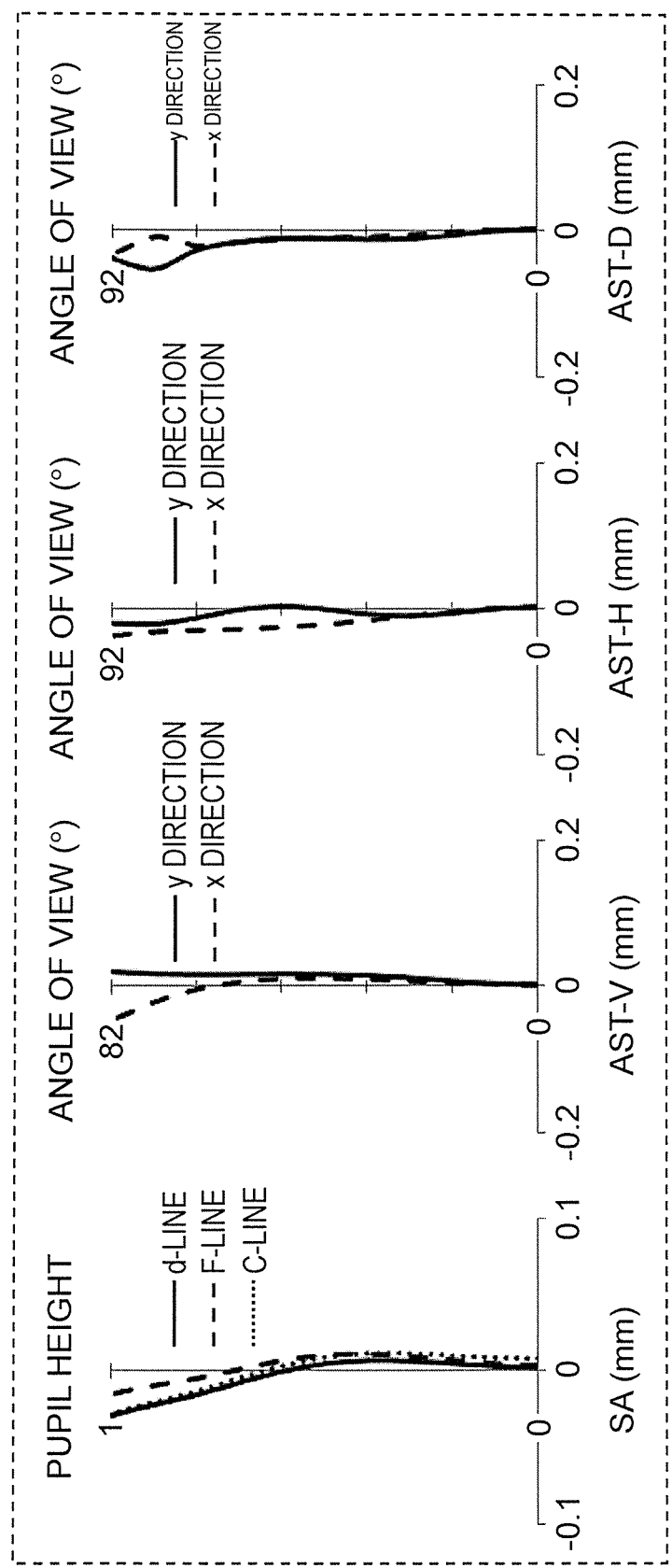
FIG. 10 is an aberration diagram illustrating spherical aberrations and curvatures of image surface in an infinity focusing state of a lens system according to a first numerical value example.

FIG. 10 is a spherical aberration diagram and astigmatism diagrams in an infinity focusing state of lens system 111 according to the first numerical value example. FIG. 10 illustrates, in order from left, spherical aberration (SA) in the shorter side direction of imaging element 102, astigmatism (AST-V), astigmatism (AST-H) in the longer side direction of imaging element 102, and astigmatism (AST-D) in the diagonal direction. In the spherical aberration diagram, a horizontal axis illustrates spherical aberrations, whereas a perpendicular axis illustrates pupil heights. A solid line illustrates a characteristic of the d-line. A short dashed line illustrates a characteristic of the C-line. A long dashed line illustrates a characteristic of the F-line. In the astigmatism diagrams, a horizontal axis illustrates astigmatism, whereas a perpendicular axis illustrates angles of view. A solid line illustrates a characteristic of a YZ plane (in the diagram, y direction). A dashed line illustrates a characteristic of an XZ plane (in the diagram, x direction).

The first exemplary embodiment uses only even-number terms, i.e., x and y, in the XY polynomial. The first exemplary embodiment is therefore symmetrical with respect to the x axis and the y axis. Astigmatism AST-D in the diagonal direction thus becomes identical in any directions.

Figure 11:
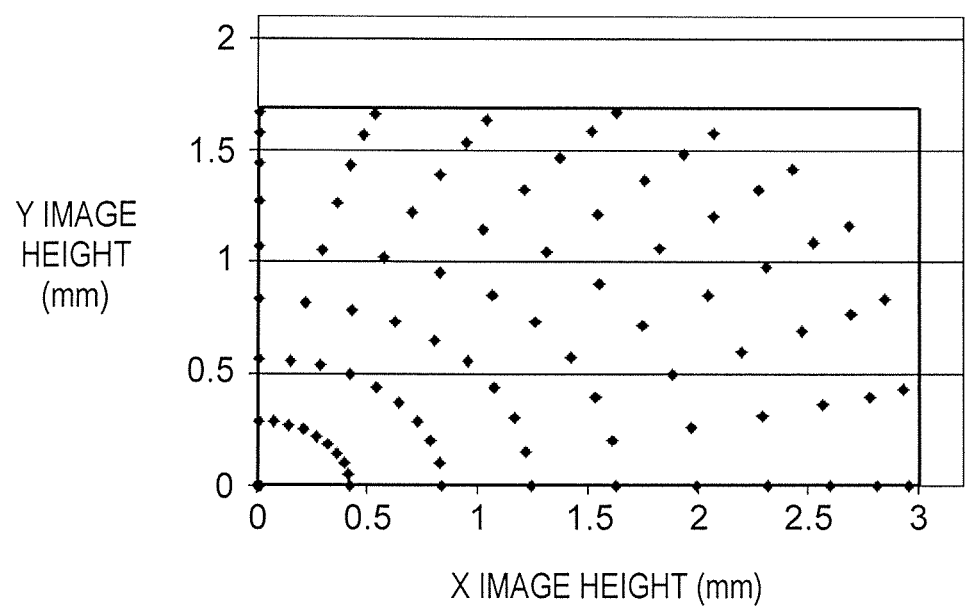
FIG. 11 is a diagram illustrating a relationship between an angle of view and an image point in the infinity focusing state of the lens system according to the first numerical value example.

FIG. 11 is a diagram illustrating a relationship between an angle of view and an image point in the infinity focusing state of lens system 111 according to the first numerical value example. FIG. 11 uses the optical axis as an origin (0,0), and plots image points per an angle of view of 10° in the first quadrant of the image surface. Other quadrants each have such a relationship, with the first quadrant, that each quadrant is line symmetrical with respect to the perpendicular axis and the horizontal axis. Compared with a normal rotational symmetrical lens, it can be seen that a shape of the image surface is expanded, and the region of the photosensitive surface of imaging element 102 having a quadrilateral shape is effectively utilized.

Lens system 111 according to the first numerical value example corresponds to the first exemplary embodiment illustrated in FIG. 1. Surface data of lens system 111 according to the first numerical value example is illustrated in Table 1. Various kinds of data is illustrated in Table 2.

Aspherical and free-curved surface data of a fifth surface, a sixth surface, a ninth surface, a tenth surface, a fifteenth surface, and a sixteenth surface is illustrated in Table 3, Table 4, Table 5, Table 6, Table 7, and Table 8, respectively.

TABLE 1

| s | Surface type | r | d | nd | vd |
|---|---|---|---|---|---|
| 1 | Spherical surface | 16.180 | 1.000 | 1.72916 | 54.7 |
| 2 | Spherical surface | 5.450 | 3.291 | | |
| 3 | Spherical surface | −42.838 | 0.800 | 1.77250 | 49.6 |
| 4 | Spherical surface | 3.975 | 2.580 | | |
| 5 | XY-polynomial surface | −5.534 | 2.000 | 1.49176 | 57.5 |
| 6 | XY-polynomial surface | 22.705 | 0.400 | | |
| 7 | Spherical surface | 16.681 | 1.500 | 1.80518 | 25.4 |
| 8 | Spherical surface | −21.386 | 0.150 | | |
| 9 | Aspherical surface | 3.354 | 1.700 | 1.49176 | 57.5 |
| 10 | Aspherical surface | 14.169 | 1.083 | | |
| 11 | Plane | Diaphragm | 0.150 | | |
| 12 | Spherical surface | 12.980 | 2.370 | 1.59522 | 67.7 |
| 13 | Spherical surface | −3.270 | 0.700 | 1.95906 | 17.5 |
| 14 | Spherical surface | −7.511 | 1.380 | | |
| 15 | XY-polynomial surface | 3.672 | 1.800 | 1.49176 | 57.5 |
| 16 | XY-polynomial surface | 6.963 | 3.565 | | |

TABLE 2

| | |
|---|---|
| F number | 2.73 |
| Perpendicular half angle of view | 82° |
| Horizontal half angle of view | 92° |
| Perpendicular image height @Perpendicular half angle of view | 1.687 |
| Horizontal image height @Horizontal half angle of view | 2.977 |
| Horizontal image height @Perpendicular half angle of view | 2.841 |
| Optical total length | 24.470 |

TABLE 3

| | s5 |
|---|---|
| C1 | 1.00000E+00 |
| C2 | 0.00000E+00 |
| C3 | 0.00000E+00 |
| C4 | 8.62090E−02 |
| C5 | 0.00000E+00 |
| C6 | −2.36648E−01 |
| C7 | 0.00000E+00 |
| C8 | 0.00000E+00 |
| C9 | 0.00000E+00 |
| C10 | 0.00000E+00 |
| C11 | −3.77420E−03 |
| C12 | 0.00000E+00 |
| C13 | 1.35286E−02 |
| C14 | 0.00000E+00 |
| C15 | −1.43532E−02 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 4.24027E−04 |
| C23 | 0.00000E+00 |
| C24 | 2.32779E−03 |
| C25 | 0.00000E+00 |
| C26 | 1.27010E−03 |
| C27 | 0.00000E+00 |
| C28 | −1.65516E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | 9.02054E−06 |
| C38 | 0.00000E+00 |
| C39 | −6.93764E−05 |
| C40 | 0.00000E+00 |
| C41 | 6.68648E−05 |
| C42 | 0.00000E+00 |
| C43 | 5.41051E−04 |
| C44 | 0.00000E+00 |
| C45 | −3.70249E−04 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | −6.79600E−06 |
| C57 | 0.00000E+00 |
| C58 | −2.00377E−05 |
| C59 | 0.00000E+00 |
| C60 | −3.45106E−05 |
| C61 | 0.00000E+00 |
| C62 | −1.58142E−04 |
| C63 | 0.00000E+00 |
| C64 | −3.69648E−04 |
| C65 | 0.00000E+00 |
| C66 | 3.33129E−04 |

TABLE 4

| | s6 |
|---|---|
| C1 | 0.00000E+00 |
| C2 | 0.00000E+00 |
| C3 | 0.00000E+00 |
| C4 | 3.60937E−02 |
| C5 | 0.00000E+00 |
| C6 | −1.09902E−01 |
| C7 | 0.00000E+00 |
| C8 | 0.00000E+00 |
| C9 | 0.00000E+00 |
| C10 | 0.00000E+00 |
| C11 | −7.77248E−03 |
| C12 | 0.00000E+00 |
| C13 | −1.67316E−04 |
| C14 | 0.00000E+00 |
| C15 | −9.60440E−04 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 1.51405E−03 |
| C23 | 0.00000E+00 |
| C24 | 3.72605E−03 |
| C25 | 0.00000E+00 |
| C26 | 3.01762E−03 |
| C27 | 0.00000E+00 |
| C28 | 9.09772E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −1.26271E−04 |
| C38 | 0.00000E+00 |
| C39 | −2.69927E−04 |
| C40 | 0.00000E+00 |
| C41 | −2.30127E−04 |
| C42 | 0.00000E+00 |
| C43 | −5.50409E−05 |
| C44 | 0.00000E+00 |
| C45 | 6.79574E−05 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 1.25389E−06 |
| C57 | 0.00000E+00 |
| C58 | −1.56641E−05 |
| C59 | 0.00000E+00 |
| C60 | −4.94111E−05 |
| C61 | 0.00000E+00 |
| C62 | −5.55090E−05 |
| C63 | 0.00000E+00 |
| C64 | −7.32391E−05 |
| C65 | 0.00000E+00 |
| C66 | −5.89790E−06 |

TABLE 5

| | s9 |
|---|---|
| K | −1.00000E+00 |
| A4 | 1.46543E−04 |
| A6 | 8.27051E−04 |
| A8 | 5.32119E−05 |
| A10 | 7.88739E−07 |
| A12 | 0.00000E+00 |
| A14 | 0.00000E+00 |
| A16 | 0.00000E+00 |

TABLE 5-continued s9

| | |
|---|---|
| A18 | 0.00000E+00 |
| A20 | 0.00000E+00 |

TABLE 6 s10

| | |
|---|---|
| K | 0.00000E+00 |
| A4 | 2.48173E−03 |
| A6 | −3.56816E−05 |
| A8 | 4.54625E−04 |
| A10 | −4.02723E−05 |
| A12 | 0.00000E+00 |
| A14 | 0.00000E+00 |
| A16 | 0.00000E+00 |
| A18 | 0.00000E+00 |
| A20 | 0.00000E+00 |

TABLE 7 s15

| | |
|---|---|
| C1 | 0.00000E+00 |
| C2 | 0.00000E+00 |
| C3 | 0.00000E+00 |
| C4 | −1.35833E−02 |
| C5 | 0.00000E+00 |
| C6 | 1.58217E−02 |
| C7 | 0.00000E+00 |
| C8 | 0.00000E+00 |
| C9 | 0.00000E+00 |
| C10 | 0.00000E+00 |
| C11 | −5.73414E−03 |
| C12 | 0.00000E+00 |
| C13 | 4.06591E−04 |
| C14 | 0.00000E+00 |
| C15 | −6.52448E−03 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | −2.00409E−04 |
| C23 | 0.00000E+00 |
| C24 | −4.48983E−04 |
| C25 | 0.00000E+00 |
| C26 | 4.22990E−04 |
| C27 | 0.00000E+00 |
| C28 | −6.89639E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −3.48081E−05 |
| C38 | 0.00000E+00 |
| C39 | −1.47712E−04 |
| C40 | 0.00000E+00 |
| C41 | −3.39200E−04 |
| C42 | 0.00000E+00 |
| C43 | 2.21761E−05 |
| C44 | 0.00000E+00 |
| C45 | −4.37885E−05 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |

TABLE 7-continued s15

| | |
|---|---|
| C52 | 0.00000E+00 |
| C53 | 0.00000E+00 |
| C54 | 0.00000E+00 |
| C55 | 0.00000E+00 |
| C56 | −4.23355E−06 |
| C57 | 0.00000E+00 |
| C58 | 7.83237E−06 |
| C59 | 0.00000E+00 |
| C60 | 1.94777E−05 |
| C61 | 0.00000E+00 |
| C62 | −3.43515E−05 |
| C63 | 0.00000E+00 |
| C64 | 6.65521E−06 |
| C65 | 0.00000E+00 |
| C66 | −1.52826E−05 |

TABLE 8 s16

| | |
|---|---|
| C1 | 0.00000E+00 |
| C2 | 0.00000E+00 |
| C3 | 0.00000E+00 |
| C4 | 2.27047E−02 |
| C5 | 0.00000E+00 |
| C6 | 3.99957E−02 |
| C7 | 0.00000E+00 |
| C8 | 0.00000E+00 |
| C9 | 0.00000E+00 |
| C10 | 0.00000E+00 |
| C11 | −4.30563E−03 |
| C12 | 0.00000E+00 |
| C13 | 2.26638E−02 |
| C14 | 0.00000E+00 |
| C15 | −1.01597E−02 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 8.46224E−06 |
| C23 | 0.00000E+00 |
| C24 | 2.80139E−04 |
| C25 | 0.00000E+00 |
| C26 | 9.60494E−04 |
| C27 | 0.00000E+00 |
| C28 | −1.85346E−03 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −1.18934E−04 |
| C38 | 0.00000E+00 |
| C39 | −4.08088E−04 |
| C40 | 0.00000E+00 |
| C41 | −6.35989E−04 |
| C42 | 0.00000E+00 |
| C43 | −1.36403E−04 |
| C44 | 0.00000E+00 |
| C45 | 1.55068E−06 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |

TABLE 8-continued

| s16 | |
|---|---|
| C56 | 6.26478E−06 |
| C57 | 0.00000E+00 |
| C58 | 2.99932E−05 |
| C59 | 0.00000E+00 |
| C60 | 5.70767E−05 |
| C61 | 0.00000E+00 |
| C62 | −1.16918E−05 |
| C63 | 0.00000E+00 |
| C64 | −5.62801E−06 |
| C65 | 0.00000E+00 |
| C66 | 1.05199E−05 |

(Second Numerical Value Example)

Figure 12:
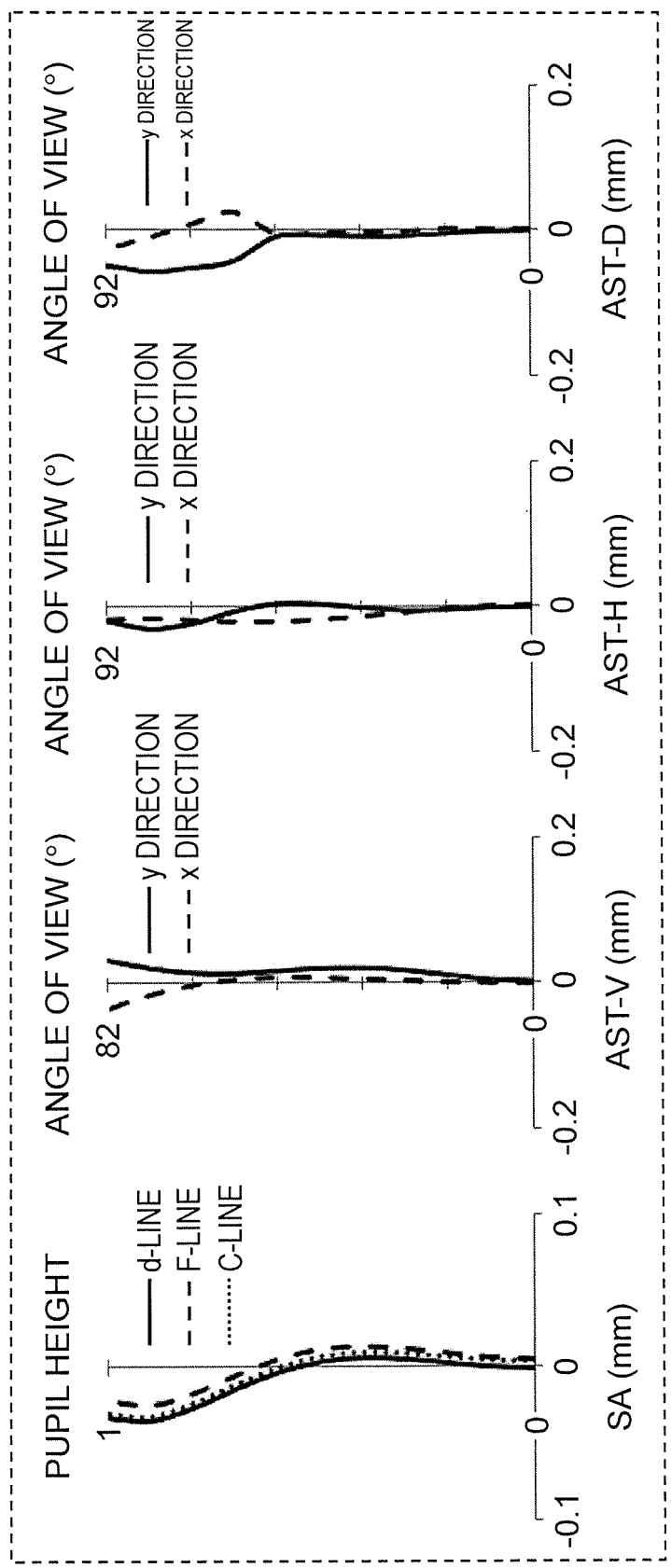
FIG. 12 is an aberration diagram illustrating spherical aberrations and curvatures of image surface in an infinity focusing state of a lens system according to a second numerical value example.
Figure 13:
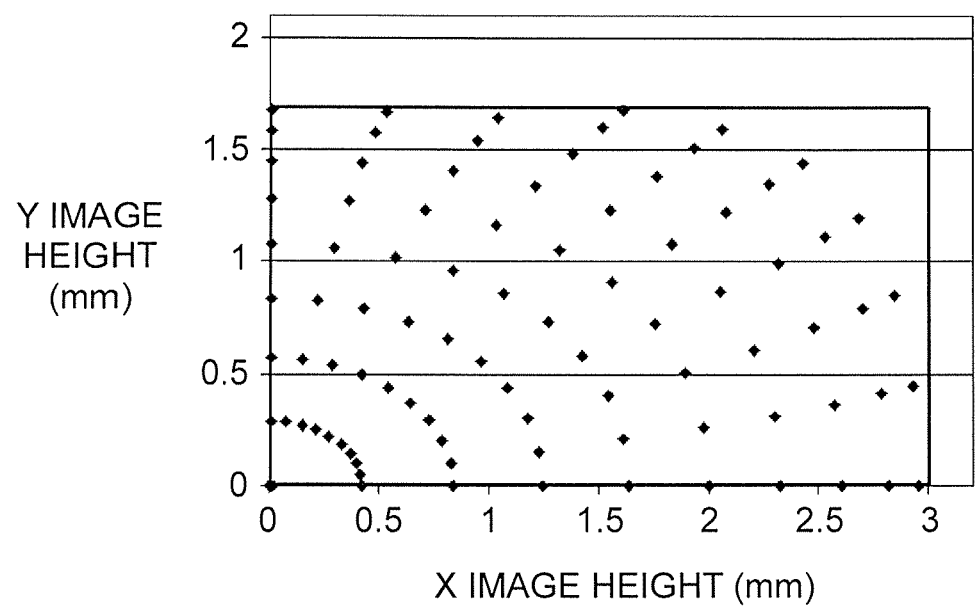
FIG. 13 is a diagram illustrating a relationship between an angle of view and an image point in the infinity focusing state of the lens system according to the second numerical value example.

FIG. 12 is a spherical aberration diagram and astigmatism diagrams in an infinity focusing state of lens system 121 according to a second numerical value example. FIG. 13 is a diagram illustrating a relationship between an angle of view and an image point in the infinity focusing state of lens system 121 according to the second numerical value example. Even in a case of lens system 121 illustrated in FIG. 13, compared with a normal rotational symmetrical lens, it can be seen that a shape of the image surface is expanded, and the region of the photosensitive surface of imaging element 102 having a quadrilateral shape is effectively utilized. Lens system 121 according to the second numerical value example corresponds to the second exemplary embodiment illustrated in FIG. 2. Surface data of lens system 121 according to the second numerical value example is illustrated in Table 9. Various kinds of data is illustrated in Table 10. Aspherical and free-curved surface data of a fifth surface, a sixth surface, a ninth surface, a tenth surface, a fifteenth surface, and a sixteenth surface is illustrated in Table 11, Table 12, Table 13, Table 14, Table 15, and Table 16, respectively.

TABLE 9

| s | Surface type | r | d | nd | vd |
|---|---|---|---|---|---|
| 1 | Spherical surface | 12.146 | 1.000 | 1.72916 | 54.7 |
| 2 | Spherical surface | 6.000 | 3.132 | | |
| 3 | Spherical surface | −63.845 | 0.800 | 1.72916 | 54.7 |
| 4 | Spherical surface | 3.118 | 2.388 | | |
| 5 | XY-polynomial surface | −4.986 | 2.000 | 1.49176 | 57.5 |
| 6 | XY-polynomial surface | 15.806 | 0.429 | | |
| 7 | Spherical surface | 17.9397 | 1.500 | 1.80610 | 40.9 |
| 8 | Spherical surface | −12.577 | 0.150 | | |
| 9 | Aspherical surface | 2.800 | 1.700 | 1.49176 | 57.5 |
| 10 | Aspherical surface | 3.914 | 1.256 | | |
| 11 | Plane | Diaphragm | 0.150 | | |
| 12 | Spherical surface | 5.525 | 3.096 | 1.59522 | 67.7 |
| 13 | Spherical surface | −3.672 | 0.600 | 1.95906 | 17.5 |
| 14 | Spherical surface | −9.084 | 0.922 | | |
| 15 | XY-polynomial surface | 5.053 | 1.600 | 1.49176 | 57.5 |
| 16 | XY-polynomial surface | 142.714 | 3.366 | | |

TABLE 10

| | |
|---|---|
| F number | 2.62 |
| Perpendicular half angle of view | 82° |
| Horizontal half angle of view | 92° |
| Perpendicular image height @Perpendicular half angle of view | 1.689 |
| Horizontal image height @Horizontal half angle of view | 2.980 |
| Horizontal image height @Perpendicular half angle of view | 2.852 |
| Optical total length | 24.090 |

TABLE 11

| s5 | |
|---|---|
| C1 | 1.00000E+00 |
| C2 | 0.00000E+00 |
| C3 | 0.00000E+00 |
| C4 | 9.82210E−02 |
| C5 | 0.00000E+00 |
| C6 | −2.39764E−01 |
| C7 | 0.00000E+00 |
| C8 | 0.00000E+00 |
| C9 | 0.00000E+00 |
| C10 | 0.00000E+00 |
| C11 | −2.60552E−03 |
| C12 | 0.00000E+00 |
| C13 | 1.97713E−02 |
| C14 | 0.00000E+00 |
| C15 | −3.46932E−03 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 5.65340E−04 |
| C23 | 0.00000E+00 |
| C24 | 1.80561E−03 |
| C25 | 0.00000E+00 |
| C26 | −1.00004E−03 |
| C27 | 0.00000E+00 |
| C28 | 2.52224E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | 5.85414E−06 |
| C38 | 0.00000E+00 |
| C39 | −9.46390E−05 |
| C40 | 0.00000E+00 |
| C41 | 3.40232E−04 |
| C42 | 0.00000E+00 |
| C43 | 1.38751E−04 |
| C44 | 0.00000E+00 |
| C45 | −1.86517E−04 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | −1.78179E−06 |
| C57 | 0.00000E+00 |
| C58 | 5.50349E−06 |
| C59 | 0.00000E+00 |
| C60 | 5.98934E−07 |
| C61 | 0.00000E+00 |
| C62 | −1.08733E−04 |
| C63 | 0.00000E+00 |
| C64 | −7.09955E−05 |
| C65 | 0.00000E+00 |
| C66 | 1.03808E−04 |

TABLE 12

| s6 | |
|---|---|
| C1 | 0.00000E+00 |
| C2 | 0.00000E+00 |
| C3 | 0.00000E+00 |
| C4 | 4.36756E−02 |

TABLE 12-continued

| s6 | |
|---|---|
| C5 | 0.00000E+00 |
| C6 | −1.08803E−01 |
| C7 | 0.00000E+00 |
| C8 | 0.00000E+00 |
| C9 | 0.00000E+00 |
| C10 | 0.00000E+00 |
| C11 | −9.69054E−03 |
| C12 | 0.00000E+00 |
| C13 | −1.00811E−03 |
| C14 | 0.00000E+00 |
| C15 | 1.10290E−03 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 1.66097E−03 |
| C23 | 0.00000E+00 |
| C24 | 3.24024E−03 |
| C25 | 0.00000E+00 |
| C26 | 2.20941E−03 |
| C27 | 0.00000E+00 |
| C28 | 8.02693E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −1.64068E−04 |
| C38 | 0.00000E+00 |
| C39 | −4.22454E−04 |
| C40 | 0.00000E+00 |
| C41 | −4.43373E−04 |
| C42 | 0.00000E+00 |
| C43 | −3.51086E−04 |
| C44 | 0.00000E+00 |
| C45 | −3.42007E−05 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 6.00027E−06 |
| C57 | 0.00000E+00 |
| C58 | 1.56463E−05 |
| C59 | 0.00000E+00 |
| C60 | 1.94011E−05 |
| C61 | 0.00000E+00 |
| C62 | 2.07297E−05 |
| C63 | 0.00000E+00 |
| C64 | 1.00502E−05 |
| C65 | 0.00000E+00 |
| C66 | 3.26489E−06 |

TABLE 13

| s9 | |
|---|---|
| K | −1.00000E+00 |
| A4 | 1.53994E−03 |
| A6 | 1.18079E−03 |
| A8 | −1.21875E−04 |
| A10 | 2.44032E−05 |
| A12 | 0.00000E+00 |
| A14 | 0.00000E+00 |
| A16 | 0.00000E+00 |

TABLE 13-continued

| s9 | |
|---|---|
| A18 | 0.00000E+00 |
| A20 | 0.00000E+00 |

TABLE 14

| s10 | |
|---|---|
| K | 0.00000E+00 |
| A4 | 4.82378E−03 |
| A6 | 3.63028E−04 |
| A8 | 3.22947E−04 |
| A10 | 3.85786E−05 |
| A12 | 0.00000E+00 |
| A14 | 0.00000E+00 |
| A16 | 0.00000E+00 |
| A18 | 0.00000E+00 |
| A20 | 0.00000E+00 |

TABLE 15

| s15 | |
|---|---|
| C1 | 0.00000E+00 |
| C2 | 0.00000E+00 |
| C3 | 0.00000E+00 |
| C4 | 3.89778E−03 |
| C5 | 0.00000E+00 |
| C6 | 1.91856E−02 |
| C7 | 0.00000E+00 |
| C8 | 0.00000E+00 |
| C9 | 0.00000E+00 |
| C10 | 0.00000E+00 |
| C11 | −3.09721E−03 |
| C12 | 0.00000E+00 |
| C13 | 4.56851E−03 |
| C14 | 0.00000E+00 |
| C15 | −3.09483E−03 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | −1.25804E−04 |
| C23 | 0.00000E+00 |
| C24 | 1.20055E−04 |
| C25 | 0.00000E+00 |
| C26 | 8.97173E−04 |
| C27 | 0.00000E+00 |
| C28 | −6.94896E−04 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −4.00939E−05 |
| C38 | 0.00000E+00 |
| C39 | −1.62966E−04 |
| C40 | 0.00000E+00 |
| C41 | −4.17055E−04 |
| C42 | 0.00000E+00 |
| C43 | 1.81808E−04 |
| C44 | 0.00000E+00 |
| C45 | −5.37771E−05 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |

TABLE 15-continued

| s15 | |
|---|---|
| C52 | 0.00000E+00 |
| C53 | 0.00000E+00 |
| C54 | 0.00000E+00 |
| C55 | 0.00000E+00 |
| C56 | −2.70980E−06 |
| C57 | 0.00000E+00 |
| C58 | 1.77985E−05 |
| C59 | 0.00000E+00 |
| C60 | 4.38182E−05 |
| C61 | 0.00000E+00 |
| C62 | −3.20220E−05 |
| C63 | 0.00000E+00 |
| C64 | 7.06257E−06 |
| C65 | 0.00000E+00 |
| C66 | −1.17007E−05 |

TABLE 16

| s16 | |
|---|---|
| C1 | 0.00000E+00 |
| C2 | 0.00000E+00 |
| C3 | 0.00000E+00 |
| C4 | 4.78645E−02 |
| C5 | 0.00000E+00 |
| C6 | 4.56322E−02 |
| C7 | 0.00000E+00 |
| C8 | 0.00000E+00 |
| C9 | 0.00000E+00 |
| C10 | 0.00000E+00 |
| C11 | −2.06385E−03 |
| C12 | 0.00000E+00 |
| C13 | 2.14463E−02 |
| C14 | 0.00000E+00 |
| C15 | −3.41602E−03 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 1.60593E−04 |
| C23 | 0.00000E+00 |
| C24 | 1.06866E−03 |
| C25 | 0.00000E+00 |
| C26 | 2.08534E−03 |
| C27 | 0.00000E+00 |
| C28 | −1.71143E−03 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −1.23326E−04 |
| C38 | 0.00000E+00 |
| C39 | −3.31890E−04 |
| C40 | 0.00000E+00 |
| C41 | −5.05216E−04 |
| C42 | 0.00000E+00 |
| C43 | 1.48931E−04 |
| C44 | 0.00000E+00 |
| C45 | −1.03464E−05 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |

TABLE 16-continued

| s16 | |
|---|---|
| C56 | 5.44613E−06 |
| C57 | 0.00000E+00 |
| C58 | 2.64149E−05 |
| C59 | 0.00000E+00 |
| C60 | 4.87517E−05 |
| C61 | 0.00000E+00 |
| C62 | −1.94661E−05 |
| C63 | 0.00000E+00 |
| C64 | −4.56261E−05 |
| C65 | 0.00000E+00 |
| C66 | 3.12212E−06 |

(Third Numerical Value Example)

Figure 14:
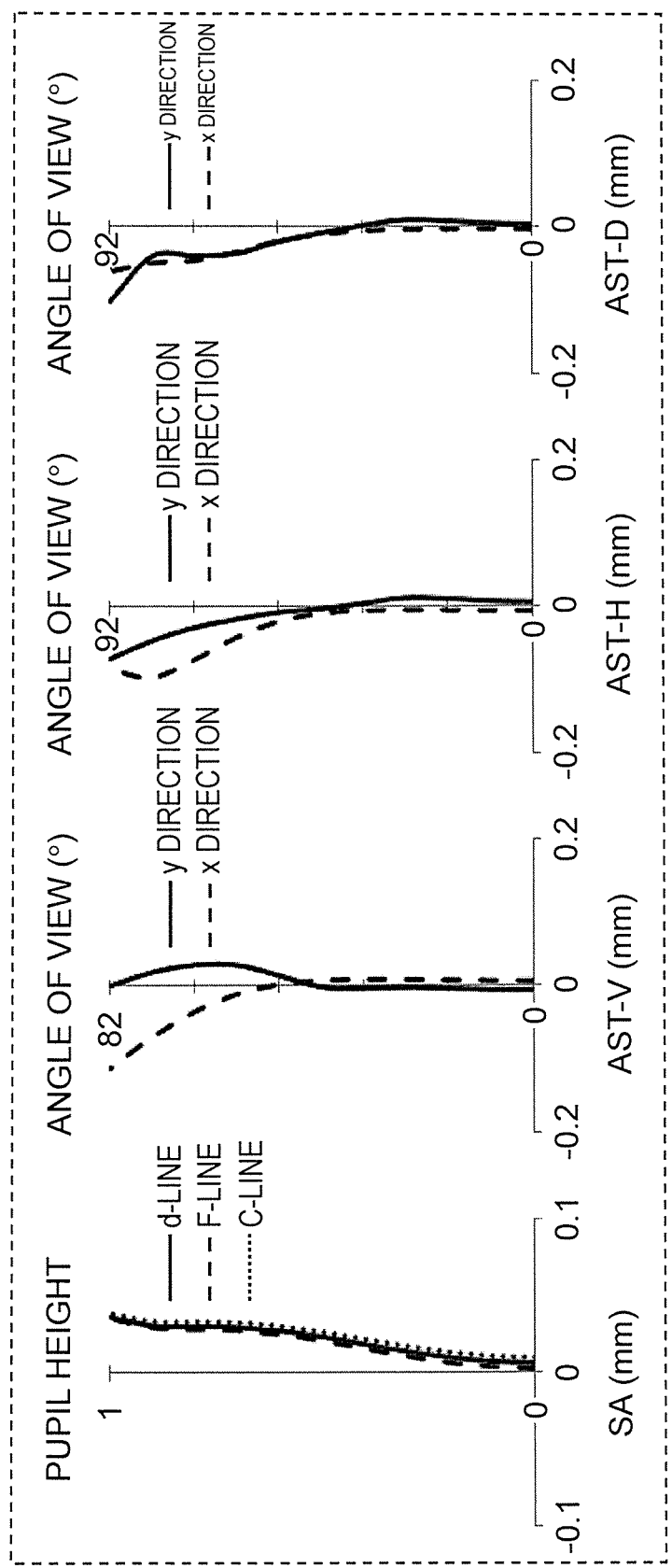
FIG. 14 is an aberration diagram illustrating spherical aberrations and curvatures of image surface in an infinity focusing state of a lens system according to a third numerical value example.
Figure 15:
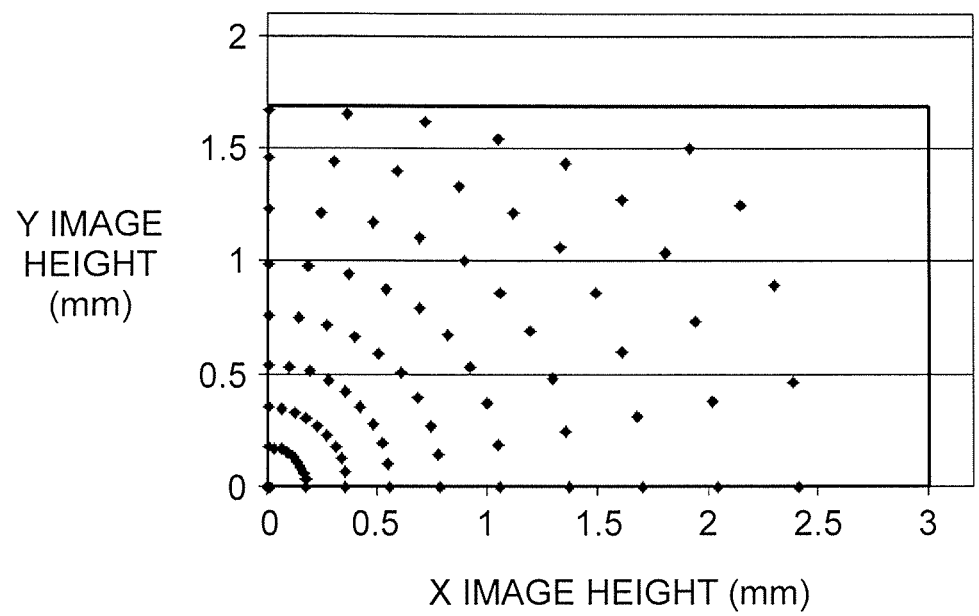
FIG. 15 is a diagram illustrating a relationship between an angle of view and an image point in the infinity focusing state of the lens system according to the third numerical value example.

FIG. 14 is a spherical aberration diagram and astigmatism diagrams in an infinity focusing state of lens system 131 according to a third numerical value example. FIG. 15 is a diagram illustrating a relationship between an angle of view and an image point in the infinity focusing state of lens system 131 according to the third numerical value example. Even in a case of lens system 131 illustrated in FIG. 15, compared with a normal rotational symmetrical lens, it can be seen that a shape of the image surface is expanded, and the region of the photosensitive surface of imaging element 102 having a quadrilateral shape is effectively utilized. Lens system 131 according to the third numerical value example corresponds to the third exemplary embodiment illustrated in FIG. 3. Surface data of lens system 131 according to the third numerical value example is illustrated in Table 17. Various kinds of data is illustrated in Table 18. Aspherical and free-curved surface data of a third surface, a fourth surface, a fifth surface, a sixth surface, a seventh surface, a tenth surface, a twelfth surface, a thirteenth surface, and a fourteenth surface is illustrated in Table 19, Table 20, Table 21, Table 22, Table 23, Table 24, Table 25, Table 26, and Table 27, respectively.

TABLE 17

| s | Surface type | r | d | nd | vd |
|---|---|---|---|---|---|
| 1 | Spherical surface | 20.939 | 1.000 | 1.77250 | 49.6 |
| 2 | Spherical surface | 7.827 | 3.400 | | |
| 3 | Aspherical surface | −139.965 | 1.000 | 1.53459 | 56.3 |
| 4 | Aspherical surface | 4.258 | 2.900 | | |
| 5 | XY-polynomial surface | −4.556 | 1.000 | 1.53459 | 56.3 |
| 6 | Aspherical surface | 2.964 | 1.459 | | |
| 7 | Aspherical surface | 6.399863 | 5.600 | 1.63450 | 23.9 |
| 8 | Spherical surface | −11.781 | 0.600 | | |
| 9 | Plane | Diaphragm | 0.200 | | |
| 10 | Aspherical surface | 3.191 | 2.600 | 1.61800 | 63.4 |
| 11 | Spherical surface | −2.170 | 0.700 | 1.84666 | 23.8 |
| 12 | Aspherical surface | −172.623 | 0.488 | | |
| 13 | XY-polynomial surface | 6.035 | 1.280 | 1.53459 | 56.3 |
| 14 | XY-polynomial surface | −2.336 | 2.153 | | |

TABLE 18

| | |
|---|---|
| F number | 3.70 |
| Perpendicular half angle of view | 82° |
| Horizontal half angle of view | 92° |
| Perpendicular image height @Perpendicular half angle of view | 1.709 |
| Horizontal image height @Horizontal half angle of view | 2.503 |
| Horizontal image height @Perpendicular half angle of view | 2.116 |
| Optical total length | 24.380 |

TABLE 19

| s3 | |
|---|---|
| K | −1.00000E+02 |
| A4 | 6.12133E−03 |
| A6 | −2.60579E−04 |
| A8 | 4.55896E−06 |
| A10 | −2.68030E−08 |
| A12 | 0.00000E+00 |
| A14 | 0.00000E+00 |
| A16 | 0.00000E+00 |
| A18 | 0.00000E+00 |
| A20 | 0.00000E+00 |

TABLE 20

| s4 | |
|---|---|
| K | 0.00000E+00 |
| A4 | 3.58941E−03 |
| A6 | 2.61463E−04 |
| A8 | −5.43945E−05 |
| A10 | 1.34565E−06 |
| A12 | 0.00000E+00 |
| A14 | 0.00000E+00 |
| A16 | 0.00000E+00 |
| A18 | 0.00000E+00 |
| A20 | 0.00000E+00 |

TABLE 21

| s5 | |
|---|---|
| C1 | 0.00000E+00 |
| C2 | 0.00000E+00 |
| C3 | 0.00000E+00 |
| C4 | 6.66292E−02 |
| C5 | 0.00000E+00 |
| C6 | 6.04249E−02 |
| C7 | 0.00000E+00 |
| C8 | 0.00000E+00 |
| C9 | 0.00000E+00 |
| C10 | 0.00000E+00 |
| C11 | 1.76954E−02 |
| C12 | 0.00000E+00 |
| C13 | 3.45749E−02 |
| C14 | 0.00000E+00 |
| C15 | 1.47355E−02 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | −1.83666E−03 |
| C23 | 0.00000E+00 |
| C24 | −5.41404E−03 |
| C25 | 0.00000E+00 |
| C26 | −5.25326E−03 |
| C27 | 0.00000E+00 |
| C28 | −1.71134E−03 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | 8.68592E−05 |
| C38 | 0.00000E+00 |
| C39 | 3.46728E−04 |
| C40 | 0.00000E+00 |
| C41 | 5.15216E−04 |
| C42 | 0.00000E+00 |
| C43 | 3.45952E−04 |

TABLE 21-continued

| s5 | |
|---|---|
| C44 | 0.00000E+00 |
| C45 | 9.62058E−05 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | −1.51280E−06 |
| C57 | 0.00000E+00 |
| C58 | −7.68253E−06 |
| C59 | 0.00000E+00 |
| C60 | −1.55560E−05 |
| C61 | 0.00000E+00 |
| C62 | −1.50949E−05 |
| C63 | 0.00000E+00 |
| C64 | −8.64710E−06 |
| C65 | 0.00000E+00 |
| C66 | −2.04717E−06 |

TABLE 22

| s6 | |
|---|---|
| K | 0.00000E+00 |
| A4 | 2.78169E−02 |
| A6 | 1.41362E−03 |
| A8 | −1.11609E−03 |
| A10 | 4.81727E−05 |
| A12 | 0.00000E+00 |
| A14 | 0.00000E+00 |
| A16 | 0.00000E+00 |
| A18 | 0.00000E+00 |
| A20 | 0.00000E+00 |

TABLE 23

| s7 | |
|---|---|
| K | 0.00000E+00 |
| A4 | 3.21014E−03 |
| A6 | 8.92253E−04 |
| A8 | −3.51402E−04 |
| A10 | 7.04325E−05 |
| A12 | −8.00000E−06 |
| A14 | 0.00000E+00 |
| A16 | 0.00000E+00 |
| A18 | 0.00000E+00 |
| A20 | 0.00000E+00 |

TABLE 24

| s10 | |
|---|---|
| K | 0.00000E+00 |
| A4 | −5.03765E−03 |
| A6 | 8.78710E−03 |
| A8 | 8.54763E−03 |
| A10 | −2.92401E−02 |
| A12 | 1.82766E−21 |
| A14 | 5.72302E−24 |
| A16 | 1.79149E−26 |
| A18 | 0.00000E+00 |
| A20 | 0.00000E+00 |

TABLE 25 s12

| | |
|---|---|
| K | 0.00000E+00 |
| A4 | −1.23149E−02 |
| A6 | 1.28353E−03 |
| A8 | 1.39797E−04 |
| A10 | −5.42405E−05 |
| A12 | 0.00000E+00 |
| A14 | 0.00000E+00 |
| A16 | 0.00000E+00 |
| A18 | 0.00000E+00 |
| A20 | 0.00000E+00 |

TABLE 26 s13

| | |
|---|---|
| C1 | 0.00000E+00 |
| C2 | 0.00000E+00 |
| C3 | 0.00000E+00 |
| C4 | 8.64225E−02 |
| C5 | 0.00000E+00 |
| C6 | 1.07422E−01 |
| C7 | 0.00000E+00 |
| C8 | 0.00000E+00 |
| C9 | 0.00000E+00 |
| C10 | 0.00000E+00 |
| C11 | −2.01893E−02 |
| C12 | 0.00000E+00 |
| C13 | 2.19255E−02 |
| C14 | 0.00000E+00 |
| C15 | −3.30992E−02 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | 5.46412E−04 |
| C23 | 0.00000E+00 |
| C24 | 4.73862E−03 |
| C25 | 0.00000E+00 |
| C26 | 8.43041E−03 |
| C27 | 0.00000E+00 |
| C28 | 1.67099E−03 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −8.61608E−04 |
| C38 | 0.00000E+00 |
| C39 | −3.55742E−03 |
| C40 | 0.00000E+00 |
| C41 | −6.46032E−03 |
| C42 | 0.00000E+00 |
| C43 | −6.50664E−03 |
| C44 | 0.00000E+00 |
| C45 | −1.58722E−03 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 9.84397E−05 |
| C57 | 0.00000E+00 |
| C58 | 3.82793E−04 |
| C59 | 0.00000E+00 |
| C60 | 8.04365E−04 |

TABLE 26-continued s13

| | |
|---|---|
| C61 | 0.00000E+00 |
| C62 | 4.98290E−04 |
| C63 | 0.00000E+00 |
| C64 | 1.71530E−03 |
| C65 | 0.00000E+00 |
| C66 | 1.80716E−04 |

TABLE 27 s14

| | |
|---|---|
| C1 | 0.00000E+00 |
| C2 | 0.00000E+00 |
| C3 | 0.00000E+00 |
| C4 | 1.76158E−01 |
| C5 | 0.00000E+00 |
| C6 | 2.08491E−01 |
| C7 | 0.00000E+00 |
| C8 | 0.00000E+00 |
| C9 | 0.00000E+00 |
| C10 | 0.00000E+00 |
| C11 | 2.50432E−02 |
| C12 | 0.00000E+00 |
| C13 | 1.36515E−01 |
| C14 | 0.00000E+00 |
| C15 | 1.92835E−04 |
| C16 | 0.00000E+00 |
| C17 | 0.00000E+00 |
| C18 | 0.00000E+00 |
| C19 | 0.00000E+00 |
| C20 | 0.00000E+00 |
| C21 | 0.00000E+00 |
| C22 | −1.66465E−03 |
| C23 | 0.00000E+00 |
| C24 | 4.11159E−03 |
| C25 | 0.00000E+00 |
| C26 | 2.84657E−03 |
| C27 | 0.00000E+00 |
| C28 | −1.41039E−03 |
| C29 | 0.00000E+00 |
| C30 | 0.00000E+00 |
| C31 | 0.00000E+00 |
| C32 | 0.00000E+00 |
| C33 | 0.00000E+00 |
| C34 | 0.00000E+00 |
| C35 | 0.00000E+00 |
| C36 | 0.00000E+00 |
| C37 | −8.06045E−04 |
| C38 | 0.00000E+00 |
| C39 | −4.15959E−03 |
| C40 | 0.00000E+00 |
| C41 | −6.00524E−03 |
| C42 | 0.00000E+00 |
| C43 | −5.25336E−03 |
| C44 | 0.00000E+00 |
| C45 | −8.28688E−04 |
| C46 | 0.00000E+00 |
| C47 | 0.00000E+00 |
| C48 | 0.00000E+00 |
| C49 | 0.00000E+00 |
| C50 | 0.00000E+00 |
| C51 | 0.00000E+00 |
| C52 | 0.00000E+00 |
| C53 | 0.00000E+00 |
| C54 | 0.00000E+00 |
| C55 | 0.00000E+00 |
| C56 | 2.28287E−04 |
| C57 | 0.00000E+00 |
| C58 | 9.83452E−04 |
| C59 | 0.00000E+00 |
| C60 | 1.20403E−03 |
| C61 | 0.00000E+00 |
| C62 | 1.18587E−03 |
| C63 | 0.00000E+00 |
| C64 | 1.50641E−03 |

TABLE 27-continued s14

| | |
|---|---|
| C65 | 0.00000E+00 |
| C66 | 2.51269E−04 |

Table 28 described below illustrates corresponding values to the conditions in the lens systems according to the numerical value examples.
(Corresponding Values to Conditions)

TABLE 28

| | First numerical value example | Second numerical value example | Third numerical value example |
|---|---|---|---|
| Condition (1) | 92.0 | 92.0 | 92.0 |
| Condition (2) | 1.684 | 1.689 | 1.238 |
| Condition (3) | 0.636 | 0.636 | 0.766 |
| Condition (4) | 10 | 10 | 10 |
| Condition (5) | 22.438 | 21.177 | 36.045 |
| Condition (6) | 1.49175 | 1.49175 | 1.53459 |
| Condition (7) | 2 | 2 | 1 |

INDUSTRIAL APPLICABILITY

The lens systems according to the implementations are applicable to digital still cameras, digital video cameras, cameras of cellular phones, cameras of personal digital assistances (PDAs), monitoring cameras of monitoring systems, Web cameras, and on-vehicle cameras, for example. In particular, the lens systems according to the implementations are preferable for photographing optical systems for which high image quality is required, such as digital still camera systems and digital video camera systems.

The lens systems according to the implementations are provided in interchangeable lens devices according to the implementations, specifically, in digital video camera systems.

What is claimed is:

1. A lens system configured to form an image on an imaging element having a quadrilateral shape disposed on an optical axis, the lens system comprising:
in order from an object side to an image surface side, a first plurality of lens elements; an aperture diaphragm; and a second plurality of lens elements, wherein:
the aperture diaphragm is disposed between an object and an image surface,
the first plurality of lens elements are disposed closer to the object than the aperture diaphragm is and includes a first free-curved lens,
the second plurality of lens elements are disposed closer to the image surface than the aperture diaphragm is and includes a second free-curved lens,
the second free-curved lens is disposed closest to the image surface, and both surfaces respectively facing the object and the image surface are free-curved surfaces asymmetrical with respect to the optical axis,
a sag amount of the second free-curved lens in a circle separated from the optical axis by a length having a predetermined ratio with respect to a minimum image height has extrema outside of a first intersection point between a first surface passing through the optical axis and parallel to longer sides of the imaging element and the circle, and a second intersection point between a second surface passing through the optical axis and parallel to shorter sides of the imaging element and the circle, and
each of the extrema is greater than the sag amount at the first intersection point or the second intersection point by 0.01 mm or greater.

2. The lens system according to claim 1, wherein the predetermined ratio ranges from 40% to 80% inclusive.

3. The lens system according to claim 1, wherein, the first plurality of lens elements further includes, in order from the object:
a first lens element that is a meniscus having a convex shape facing the object and having negative power; and
a second lens element having negative power.

4. The lens system according to claim 3, wherein the first free-curved lens is closer to the image surface than the second lens element is, and has a free-curved surface at least on a side closer to the object.

5. The lens system according to claim 1, further comprising at least three or more lens elements being rotational symmetrical with respect to the optical axis.

6. The lens system according to claim 1, wherein the extrema fall within a range of ±25° in each of directions from a third intersection point between a photosensitive surface of the imaging element and the optical axis to corners of the photosensitive surface.

7. The lens system according to claim 1, wherein, when a ratio between each of longer sides and each of shorter sides of the photosensitive surface of the imaging element is a : b, the extrema fall within a range of $\tan^{-1}(b/a) \pm 25°$ with respect to the first surface.

8. The lens system according to claim 1, wherein, when a ratio between each of the longer sides and each of the shorter sides of the imaging element is 16:9, the extrema fall within a range of 29° ±25° with respect to the first surface.

9. The lens system according to claim 1, wherein the extrema fall within a range of 33° ±21° with respect to the first surface.

10. The lens system according to claim 1, wherein a condition (1) below is satisfied:

$$\omega_{LONG} > 60° \quad (1)$$

where,
$\omega_{LONG}$ is a maximum half angle of view in a longer side direction of the imaging element.

11. The lens system according to claim 1, wherein a condition (2) below is satisfied:

$$1 < D_{LSHORT}/D_{SSHORT} \quad (2)$$

where,
$D_{LSHORT}$ is a maximum distance in a longer side direction between an image point with respect to incident light in the longer side direction of the imaging element and an image point with respect to incident light perpendicular to the imaging element, within an angle of view equivalent to a maximum half angle of view in a shorter side direction of the imaging element, and
$D_{SSHORT}$ is a maximum distance in the shorter side direction between an image point with respect to incident light and an image point with respect to incident light perpendicular to the imaging element, within the maximum half angle of view in the shorter side direction of the imaging element.

12. The lens system according to claim 1, wherein a condition (3) below is satisfied:

$$0.5 < D_{SSHORT} \times \omega_{LONG}/(d_{LLONG} \times \omega_{SHORT}) < 1 \quad (3)$$

where,
- $\omega_{LONG}$ is a maximum half angle of view in a longer side direction of the imaging element,
- $\omega_{SHORT}$ is a maximum half angle of view in a shorter side direction of the imaging element,
- $D_{LLONG}$ is a maximum distance in the longer side direction between an image point with respect to incident light and an image point with respect to incident light perpendicular to the imaging element, within the maximum half angle of view in the longer side direction of the imaging element, and
- $D_{SSHORT}$ is a maximum distance in the shorter side direction between an image point with respect to incident light and an image point with respect to incident light perpendicular to the imaging element, within the maximum half angle of view in the shorter side direction of the imaging element.

13. The lens system according to claim 1, wherein a condition (4) below is satisfied:

$$\omega_{LONG} - \omega_{SHORT} > 0 \tag{4}$$

where,
- $\omega_{LONG}$ is a maximum half angle of view in a longer side direction of the imaging element, and
- $\omega_{SHORT}$ is a maximum half angle of view in a shorter side direction of the imaging element.

14. The lens system according to claim 1, wherein a condition (5) below is satisfied:

$$L \times Fno./D_{LLONG} < 40 \tag{5}$$

where,
- L is an optical total length of the lens system,
- Fno is an F value of the lens system, and
- $D_{LLONG}$ is a maximum distance in a longer side direction between an image point with respect to incident light and an image point with respect to incident light perpendicular to the imaging element, within a maximum half angle of view in the longer side direction of the imaging element.

15. The lens system according to claim 1, wherein a condition (6) below is satisfied:

$$n_{FREE} < 1.7 \tag{6}$$

where,
- $n_{FREE}$ is a refraction factor with respect to a d-line of the first free-curved lens or the second free-curved lens.

16. The lens system according to claim 1, further comprising:
lens elements; and
an aperture diaphragm, wherein a condition (7) below is satisfied:

$$-3 \leq N_o - N_i \leq 3 \tag{7}$$

where,
- $N_o$ is a number of the lens elements disposed closer to an object than the aperture diaphragm is, and p1 $N_i$ is a number of the lens elements including the second free-curved lens and disposed closer to an image surface than the aperture diaphragm is.

17. The lens system according to claim 1, wherein the imaging element does not include an image circle of the lens system.

18. A camera system comprising:
the lens system according to claim 1; and
the imaging element having a quadrilateral shape and disposed at a position at which the lens system forms an image on the optical axis.

19. An imaging system comprising:
the lens system according to claim 1;
the imaging element having a quadrilateral shape and disposed at a position at which the lens system forms an image on the optical axis; and
an image processor configured to process the image generated by the imaging element.

* * * * *